(12) United States Patent
Hashimoto et al.

(10) Patent No.: US 11,332,114 B2
(45) Date of Patent: May 17, 2022

(54) VEHICLE CONTROL DATA GENERATION METHOD, VEHICLE CONTROLLER, VEHICLE CONTROL SYSTEM, AND VEHICLE LEARNING DEVICE

(71) Applicant: TOYOTA JIDOSHA KABUSHIKI KAISHA, Toyota (JP)

(72) Inventors: Yosuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/160,487

(22) Filed: Jan. 28, 2021

(65) Prior Publication Data

US 2021/0254571 A1    Aug. 19, 2021

(30) Foreign Application Priority Data

Feb. 17, 2020    (JP) .............................. JP2020-024222

(51) Int. Cl.
*B60W 10/06* (2006.01)
*B60W 10/08* (2006.01)
*B60W 10/04* (2006.01)
*F02D 41/24* (2006.01)
(Continued)

(52) U.S. Cl.
CPC ............ *B60W 10/04* (2013.01); *B60W 10/06* (2013.01); *B60W 10/08* (2013.01); *F02D 41/2409* (2013.01); *F02D 41/2438* (2013.01); *G06N 20/00* (2019.01); *B60W 2050/0014* (2013.01);
(Continued)

(58) Field of Classification Search
CPC ................ B60W 10/06; B60W 10/08; B60W 2050/0014; B60W 2050/0026; F02D 2200/1002
See application file for complete search history.

(56) References Cited

U.S. PATENT DOCUMENTS

| 5,951,614 A * | 9/1999 | Tabata .................. B60W 20/10 701/54 |
| 2011/0238255 A1* | 9/2011 | Sano .................... B60R 16/0236 701/31.4 |
| 2019/0370637 A1* | 12/2019 | Dunning ................. G06F 17/18 |

FOREIGN PATENT DOCUMENTS

JP    2016-006327 A    1/2016

\* cited by examiner

*Primary Examiner* — Edwin A Young
(74) *Attorney, Agent, or Firm* — Oblon, McClelland, Maier & Neustadt, L.L.P.

(57) ABSTRACT

A vehicle control data generation method includes causing processing circuitry to execute an obtaining process that obtains a state of a vehicle and a specifying variable, an operating process that operates an electronic device, a reward calculating process that provides a greater reward when a characteristic of the vehicle meets a standard than when the characteristic does not meet the standard, and an updating process that updates relationship defining data. The update map outputs the updated relationship defining data. The reward calculating process includes a changing process that changes the reward, provided when the characteristic of the vehicle is a predetermined characteristic, such that the reward in a case where torque generated by an internal combustion engine is used to generate the propelling force of the vehicle differs from the reward in a case where the torque is not used to generate the propelling force.

7 Claims, 10 Drawing Sheets

(51) Int. Cl.
 *G06N 20/00* (2019.01)
 *B60W 50/00* (2006.01)
(52) U.S. Cl.
 CPC ............... *B60W 2050/0026* (2013.01); *F02D 2200/1002* (2013.01)

VEHICLE CONTROL DATA GENERATION METHOD, VEHICLE CONTROLLER, VEHICLE CONTROL SYSTEM, AND VEHICLE LEARNING DEVICE

BACKGROUND

1. Field

The present disclosure relates to a vehicle control data generation method, a vehicle controller, a vehicle control system, and a vehicle learning device.

2. Description of Related Art

Japanese Laid-Open Patent Publication No. 2016-6327 discloses an example of a controller that controls a throttle valve based on a value obtained by processing the operation amount of an accelerator pedal with a filter. The throttle valve is an example of operation units of an internal combustion engine mounted on a vehicle.

The above-described filter needs to be configured to set the operation amount of the throttle valve of the internal combustion engine mounted on the vehicle to an appropriate operation amount in correspondence with the operation amount of the accelerator pedal. Thus, setting the filter requires a great number of man-hours by skilled workers. In this manner, setting operation amounts or the like of electronic devices in a vehicle in correspondence with the state of the vehicle requires a great number of man-hours by skilled workers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples of the present disclosure will now be described.

Example 1: A vehicle control data generation method is provided. A memory device stores relationship defining data that defines a relationship between a state of a vehicle including a rotating electric machine and an internal combustion engine and an action variable related to operation of an electronic device in the vehicle. The generation method includes causing processing circuitry to execute an obtaining process that obtains a specifying variable, the specifying variable specifying whether the state of the vehicle obtained based on a detection value of a sensor and torque generated by the internal combustion engine in a running state of the internal combustion engine are used to generate a propelling force of the vehicle, an operating process that operates the electronic device, a reward calculating process that provides, based on the state of the vehicle obtained by the obtaining process, a greater reward when a characteristic of the vehicle meets a standard than when the characteristic of the vehicle does not meet the standard, and an updating process that updates the relationship defining data by inputting, to a predetermined update map, the state of the vehicle obtained by the obtaining process, a value of the action variable used to operate the electronic device, and the reward corresponding to the operation of the electronic device. The update map outputs the updated relationship defining data so as to increase an expected return for the reward in a case where the electronic device is operated in accordance with the relationship defining data. The reward calculating process includes a changing process that changes the reward, provided when the characteristic of the vehicle is a predetermined characteristic, such that the reward in a case where the torque generated by the internal combustion engine in the running state of the internal combustion engine is used to generate the propelling force of the vehicle differs from the reward in a case where the torque is not used to generate the propelling force.

In the above-described method, by calculating the reward that results from the operation of the electronic device, it is possible to understand what kind of reward is obtained by the operation. Updating the relationship defining data in accordance with the update map conforming to reinforcement learning allows the relationship between the state of the vehicle and the action variable to be suitable. Accordingly, the man-hours by skilled workers are reduced when the relationship between the state of the vehicle and the action variable is set to be appropriate.

For example, a suitable operation for the electronic device in the operation unit of the internal combustion engine may be different between when the torque of the internal combustion engine is used to generate the propelling force of the vehicle and when the torque is used to only generate power without being used to generate the propelling force. The above-described method learns the relationship defining data through reinforcement learning while changing the manner of providing the reward in correspondence with the specifying variable. Thus, the relationship defining data with which control suitable for the application purpose of the torque generated by the internal combustion engine can be learned.

Example 2: In the vehicle control data generation method according to Example 1, the reward calculating process includes a process that provides a greater reward when an energy use efficiency is high than when the energy use efficiency is low. The changing process includes a process that changes the reward such that increasing the energy use efficiency becomes more advantageous to obtain a great reward in the case where the torque generated by the internal combustion engine in the running state of the internal combustion engine is not used to generate the propelling force of the vehicle than in the case where the torque is used to generate the propelling force.

In the above-described changing process, when the torque generated by the internal combustion engine is not used to generate the propelling force of the vehicle, there is no requested element or the like related to acceleration response of the vehicle. Thus, the reward is provided such that increasing the energy use efficiency becomes more advantageous as compared with when the torque generated by the internal combustion engine is used to generate the propelling force of the vehicle. Accordingly, when the torque generated by the internal combustion engine is not used to generate the propelling force of the vehicle, fuel can be efficiently converted into electric energy.

Example 3: The vehicle control data generation method according to Example 1 further include causing the processing circuitry to execute a process that generates control map data, based on the relationship defining data updated by the updating process, by associating the state of the vehicle with the value of the action variable that maximizes the expected return, the control map data using the state of the vehicle as an input and outputting the value of the action variable that maximizes the expected return.

In the above-described method, the control mapping data is generated based on the relationship defining data that has been learned through reinforcement learning. Thus, the implementation of the control map data in the controller allows the value of the action variable that maximizes the expected return to be easily set based on the state of the vehicle and the action variable.

Example 4: A controller for a vehicle including a rotating electric machine and an internal combustion engine is provided. The controller includes a memory device configured to store relationship defining data that defines a relationship between a state of the vehicle and an action variable related to operation of an electronic device in the vehicle and processing circuitry. The processing circuitry is configured to execute an obtaining process that obtains a specifying variable, the specifying variable specifying whether the state of the vehicle obtained based on a detection value of a sensor and torque generated by the internal combustion engine in a running state of the internal combustion engine are used to generate a propelling force of the vehicle, an operating process that operates, based on the relationship defining data, the electronic device in correspondence with a value of the action variable corresponding to the state of vehicle, a reward calculating process that provides, based on the state of the vehicle obtained by the obtaining process, a greater reward when a characteristic of the vehicle meets a standard than when the characteristic of the vehicle does not meet the standard, and an updating process that updates the relationship defining data by inputting, to a predetermined update map, the state of the vehicle obtained by the obtaining process, a value of the action variable used to operate the electronic device, and the reward corresponding to the operation of the electronic device. The update map outputs the updated relationship defining data so as to increase an expected return for the reward in a case where the electronic device is operated in accordance with the relationship defining data. The reward calculating process includes a changing process that changes the reward, provided when the characteristic of the vehicle is a predetermined characteristic, such that the reward in a case where the torque generated by the internal combustion engine in the running state of the internal combustion engine is used to generate the propelling force of the vehicle differs from the reward in a case where the torque is not used to generate the propelling force.

In the above-described configuration, the relationship defining data learned through reinforcement learning is used to set the value of the action variable. By operating the electronic device based on that value, it is possible to operate the electronic device such that the expected return increases.

Example 5: A control system for a vehicle including a rotating electric machine and an internal combustion engine is provided. The control system includes a memory device configured to store relationship defining data that defines a relationship between a state of the vehicle and an action variable related to operation of an electronic device in the vehicle and processing circuitry. The processing circuitry is configured to execute an obtaining process that obtains a specifying variable, the specifying variable specifying whether the ate of the vehicle obtained based on a detection value of a sensor and torque generated by the internal combustion engine in a running state of the internal combustion engine are used to generate a propelling force of the vehicle, an operating process that operates, based on the relationship defining data, the electronic device in correspondence with a value of the action variable corresponding to the state of vehicle, a reward calculating process that provides, based on the state of the vehicle obtained by the obtaining process, a greater reward when a characteristic of the vehicle meets a standard than when the characteristic of the vehicle does not meet the standard, and an updating process that updates the relationship defining data by inputting, to a predetermined update map, the state of the vehicle obtained by the obtaining process, a value of the action variable used to operate the electronic device, and the reward corresponding to the operation of the electronic device. The update map outputs the updated relationship defining data so as to increase an expected return for the reward in a case where the electronic device is operated in accordance with the relationship defining data. The reward calculating process includes a changing process that changes the reward, provided when the characteristic of the vehicle is a predetermined characteristic, such that the reward in a case where the torque generated by the internal combustion engine in the running state of the internal combustion engine is used to generate the propelling force of the vehicle differs from the reward in a case where the torque is not used to generate the propelling force. The processing circuitry includes a first processing circuitry mounted on the vehicle and a second processing circuitry that differs from an in-vehicle device. The first processing circuitry is configured to execute at least the obtaining process and the operating process. The second processing circuitry is configured to execute at least the updating process.

In the above-described configuration, the second processing circuitry executes the updating process. Thus, as compared with when the first processing circuitry executes the updating process, the computation load on the first processing circuitry is reduced.

The phrase "second processing circuitry differs from an in-vehicle device" means that the second processing circuitry is not an in-vehicle device.

Example 6: A vehicle controller including the first processing circuitry of the vehicle control system according to Example 5 is provided.

Example 7: A vehicle learning device including the second processing circuitry of the vehicle control system according to Example 5 is provided.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A vehicle control data generation method, a vehicle controller, a vehicle control system, and a vehicle learning device according to embodiments will now be described with reference to the drawings.

First Embodiment

Figure 1:
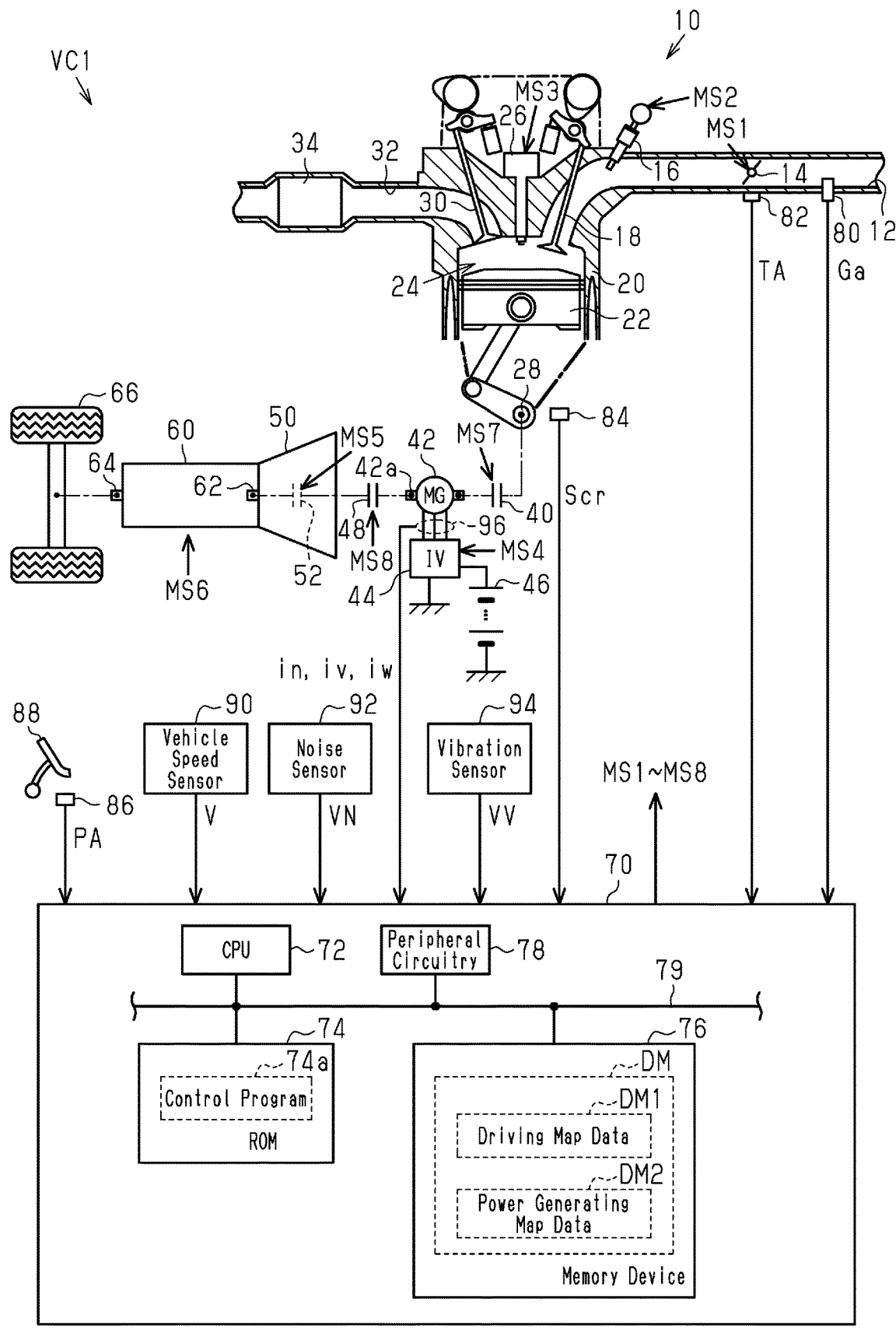
FIG. 1 is a diagram showing a controller and a drive system according to a first embodiment.

FIG. 1 shows the configuration of a drive system and a controller 70 of a vehicle VC1 according to the present embodiment.

As shown in FIG. 1, an internal combustion engine 10 includes an intake passage 12, which is provided with a throttle valve 14 and a fuel injection valve 16 sequentially from the upstream side. The air drawn into the intake passage 12 and the fuel injected from the fuel injection valve 16 flow into a combustion chamber 24, which is defined by a cylinder 20 and a piston 22, as an intake valve 18 opens. In the combustion chamber 24, the air-fuel mixture of fuel and air is burned by spark discharge of the ignition device 26. The energy generated by the combustion is converted into rotation energy of a crankshaft 28 by the piston 22. The burned air-fuel mixture is discharged to an exhaust passage 32 as exhaust gas when an exhaust valve 30 is opened. The exhaust passage 32 is provided with a catalyst 34, which is an aftertreatment device for purifying exhaust gas.

A rotary shaft 42a of a motor generator 42 is mechanically couplable to the crankshaft 28 via a clutch 40. The motor generator 42 includes multiple terminals. The terminal voltage at a battery 46, which is a direct-current voltage source, is converted into alternating-current voltage by an inverter 44 and applied to each of the terminals.

An input shaft 62 of a transmission 60 is mechanically couplable to the rotary shaft 42a via a clutch 48 and a torque converter 50, which includes a lockup clutch 52. The transmission 60 varies a gear ratio, which is the ratio of the rotation speed of the input shaft 62 and the rotation speed of an output shaft 64. Driven wheels 66 are mechanically coupled to the output shaft 64.

The controller 70 controls the internal combustion engine 10. Specifically, the controller 70 controls operation units of the internal combustion engine 10 in order to control the controlled variables of the internal combustion engine 10 (for example, torque and exhaust component ratio). Examples of the operation units include the throttle valve 14, the fuel injection valve 16, and the ignition device 26. The controller 70 controls the motor generator 42. Specifically, the controller 70 operates the inverter 44 in order to control, for example, the torque and rotation speed of the motor generator 42. The controller 70 controls the torque converter 50. Specifically, the controller 70 operates the lockup clutch 52 to control an engagement state of the lockup clutch 52. Further, the controller 70 controls the transmission 60. Specifically, the controller 70 operates the transmission 60 in order to control the controlled variables of the transmission 60 (for example, gear ratio). FIG. 1 shows operation signals MS1 to MS8, which respectively correspond to the throttle valve 14, the fuel injection valve 16, the ignition device 26, the inverter 44, the lockup clutch 52, the transmission 60, the clutch 40, the clutch 48.

To control the controlled variables, the controller 70 refers to, for example, an intake air amount Ga, which is detected by an air flow meter 80, an opening degree of the throttle valve 14, which is detected by a throttle sensor 82 (throttle opening degree TA), and an output signal Scr of a crank angle sensor 84. The controller 70 also refers to a depression amount of an accelerator pedal 88 (accelerator operation amount PA), which is detected by an accelerator sensor 86, and a vehicle speed V, which is detected by a vehicle speed sensor 90. The controller 70 further refers to a noise intensity VN in the vehicle compartment, which is detected by a noise sensor 92, a vibration intensity VV in the vehicle compartment, which is detected by a vibration sensor 94, and currents iu, iv, iw, which are detected by a current sensor 96 and flow through the motor generator 42.

The controller 70 executes a driving mode and a power generating mode. The driving mode sets the clutches 40, 48 to engaged states, transmits the power of the internal combustion engine 10 to the driven wheels 66, and uses the torque of the internal combustion engine 10 to generate the propelling force of the vehicle VC1. The power generating mode sets the clutch 48 to disengaged states, and converts the power of the internal combustion engine 10 into electrical energy by the motor generator 42 to charge the battery 46. In the driving mode, the controller 70 transmits the power of the internal combustion engine 10 and the power of the motor generator 42 to the driven wheels 66 at a distribution ratio that has been defined in advance in correspondence with the power requested for the vehicle VC1.

The controller 70 includes a CPU 72, a ROM 74, an electrically-rewritable nonvolatile memory (memory device 76), and peripheral circuitry 78, which can communicate with one another via a local network 79. The peripheral circuitry 78 includes a circuit that generates a clock signal regulating internal operations, a power supply circuit, and a reset circuit.

The ROM 74 stores a control program 74a. The control program 74a commands the execution of control while the internal combustion engine 10 is running. The memory device 76 stores map data DM. The map data DM includes driving map data DM1, which is used for the driving mode, and power generating map data DM2, which is used for the power generating mode. In the driving map data DM1, the current gear ratio GR, the vehicle speed V, and the time-series data of the accelerator operation amount PA in the driving mode are used as input variables, and a command value of the throttle opening degree TA (throttle command value TA*) and a command value of the gear ratio GR (gear ratio command value GR*) are used as output variables. In the power generating map data DM2, an output command value P* for the internal combustion engine 10 and a rotation speed NE of the internal combustion engine 10 are used as input variables, and the throttle command value TA* is used as an output variable. The map data refers to a data set of discrete values of the input variables and values of the output variables each corresponding to a value of the input variable.

Figure 2:
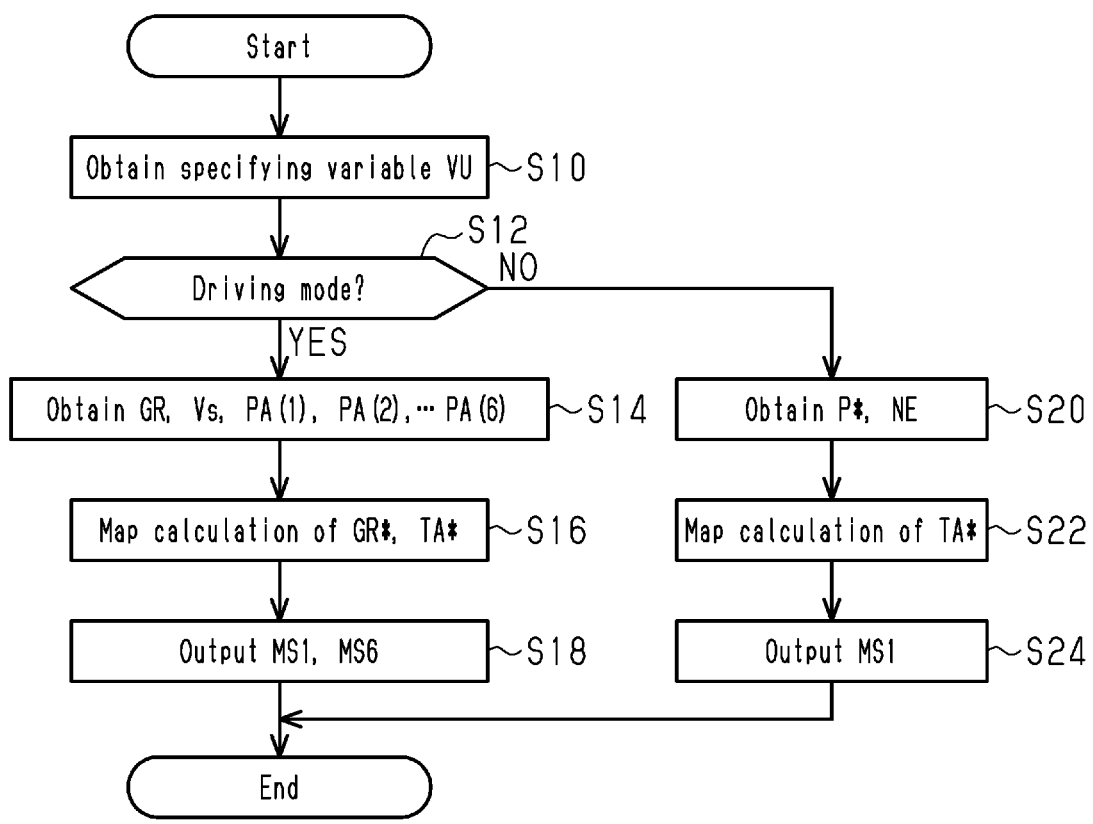
FIG. 2 is a flowchart illustrating a procedure for processes executed by the controller in FIG. 1.

FIG. 2 shows a procedure for processes executed by the controller 70 of the present embodiment. The processes shown in FIG. 2 are executed by the CPU 72 repeatedly executing the control program 74a stored in the ROM 74 in a predetermined cycle on condition that, for example, the internal combustion engine 10 is in a running state. In the following description, the number of each step is represented by the letter S followed by a numeral.

In a series of processes shown in FIG. 2, the CPU 72 first obtains a specifying variable VU, which specifies whether the driving mode or the power generating mode is being executed (S10). When determining that the specifying variable VU indicates the driving mode (S12: YES), the CPU 72 obtains time-series data including six sampled values PA(1), PA(2), ... PA(6) of the accelerator operation amount PA, the current gear ratio GR, and the vehicle speed V (S14). The sampled values included in the time-series data have been sampled at different points in time. The six sampled values are, for example, sampled in a constant sample cycle, and consecutive in time.

The CPU 72 uses the driving map data DM1 to obtain the throttle command value TA* and the gear ratio command value GR* through map calculation (S16). When the value of an input variable matches any of the values of the input variable on the map data, the map calculation simply needs to use, as the calculation result, the value of the corresponding output variable on the map data. When the value of the input variable does not match any of the values of the input variable on the map data, the map calculation simply needs to use, as the calculation result, a value obtained by interpolation of multiple values of the output variables included in the map data.

The CPU 72 outputs the operation signal MS1 to the throttle valve 14 to control the throttle opening degree TA, and outputs the operation signal MS6 to the transmission 60 to control the gear ratio (S18). In this example, feedback control is performed to adjust the throttle opening degree TA to the throttle command value TA*. In this case, even if the throttle command value TA* remains the same value, the operation signal MS1 may have different values.

When determining that the specifying variable VU indicates the power generating mode (S12: NO), the CPU 72 obtains the output command value P*, which is a command value of the output for the internal combustion engine 10, and the rotation speed NE of the internal combustion engine 10 (S20). The rotation speed NE is calculated by the CPU 72 based on the output signal Scr. Next, the CPU 72 uses the power generating map data DM2 to set the output command value P* and the rotation speed NE as input variables and obtain the throttle command value TA* through map calculation (S22). Then, in order to control the throttle opening degree TA to the throttle command value TA*, the CPU 72 controls the throttle opening degree TA by outputting the operation signal MS1 to the throttle valve 14 (S24).

When the process of step S18 or S24 is completed, the CPU 72 suspends the series of processes shown in FIG. 2.

Figure 3:
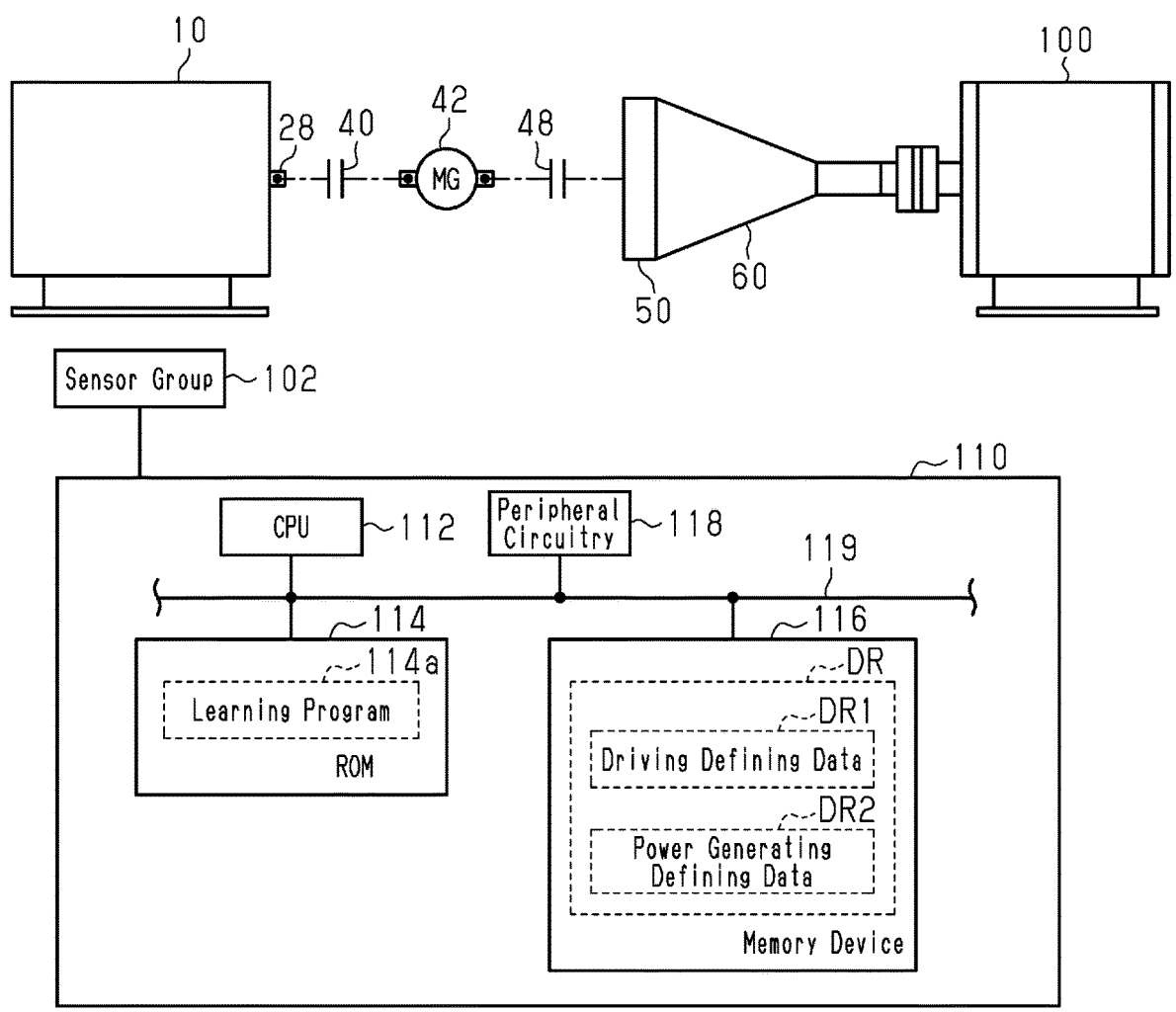
FIG. 3 is a diagram showing a system that generates the map data according to the first embodiment.

FIG. 3 shows a system that generates the map data DM.

As shown in FIG. 3, the crankshaft 28 of the internal combustion engine 10 is mechanically couplable to the motor generator 42 via the clutch 40. A dynamometer 100 is mechanically couplable to the clutch 48, the torque converter 50, and the transmission 60. Various state variables that occur when the internal combustion engine 10 is operated are detected by a sensor group 102. The detection results are input to a generation device 110, which is a computer that generates the map data DM. The sensor group 102 includes one or more sensors mounted on the vehicle VC1, which is shown in FIG. 1.

The generation device 110 includes a CPU 112, a ROM 114, an electrically-rewritable nonvolatile memory (memory device 116), and peripheral circuitry 118, which can communicate with each other via a local network 119. The memory device 116 stores relationship defining data DR, which includes driving defining data DR1 and power generating defining data DR2. The driving defining data DR1 defines the relationship between the time-series data of the accelerator operation amount PA, the vehicle speed V, and the gear ratio GR, which are state variables, and the throttle command value TA* and the gear ratio command value GR*, which are action variables. The power generating defining data DR2 defines the relationship between the output command value P* and the rotation speed NE of the internal combustion engine 10, which are state variables, and the throttle command value TA*, which is an action variable. The ROM 114 stores a learning program 114a, which learns the relationship defining data DR through reinforcement learning.

Figure 4:
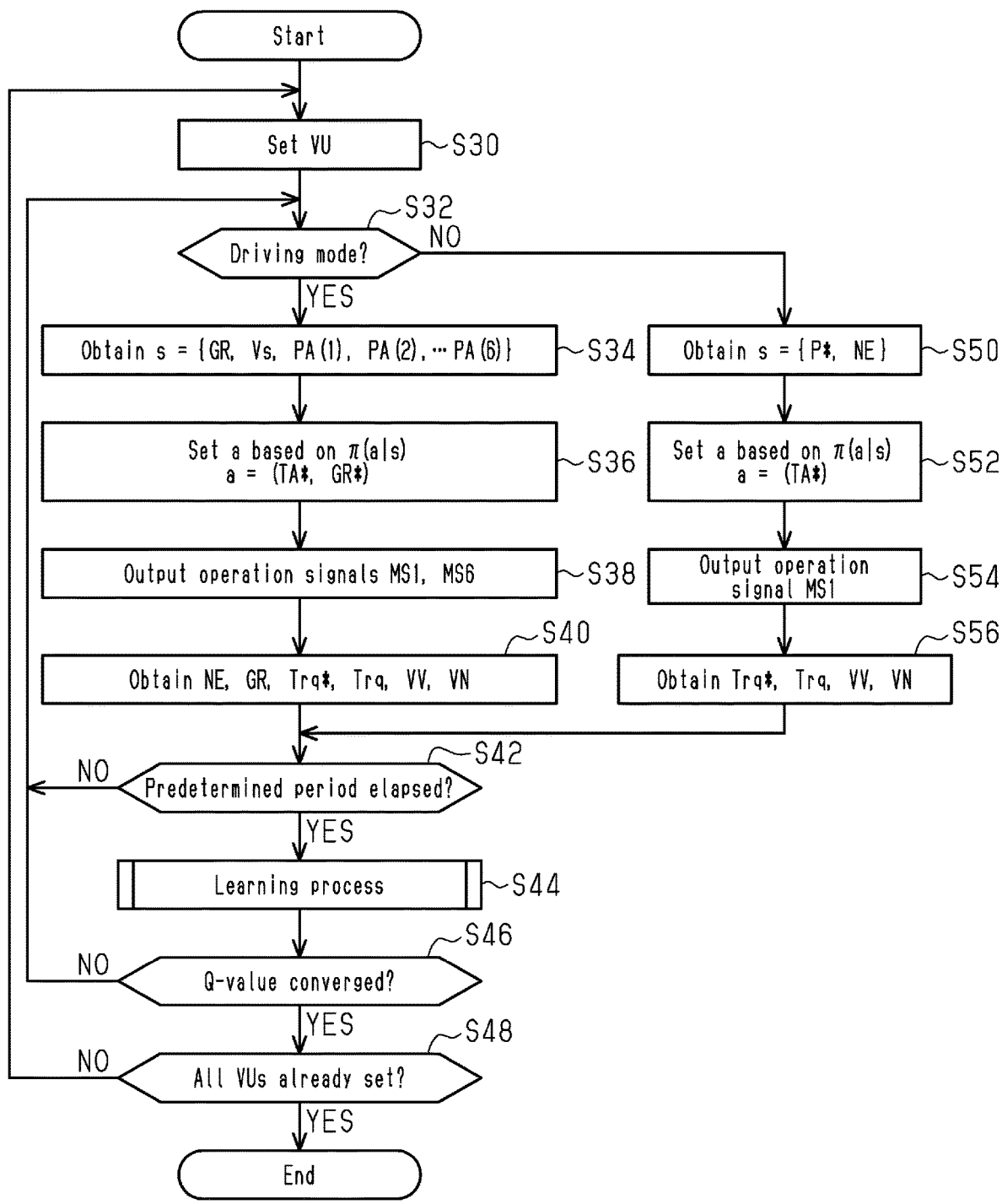
FIG. 4 is a flowchart illustrating a procedure for processes executed by the system according to the first embodiment.

FIG. 4 shows a procedure for processes executed by the generation device 110. The process shown in FIG. 4 is implemented by the CPU 112 executing the learning program 114a stored in the ROM 114.

In the series of processes shown in FIG. 4, the CPU 112 first sets the value of the specifying variable VU (S30). Next, the CPU 112 determines whether the value of the specifying variable VU set in S30 corresponds to the driving mode (S32). When determining that the set value of the specifying variable VU corresponds to the driving mode (S32: YES), the CPU 112 sets (obtains), with the internal combustion engine 10 running, the time-series data of the accelerator operation amount PA, the current gear ratio GR, and the vehicle speed V as a state s (S34). Although the time-series data is the same as the data obtained in S14, the system in FIG. 3 does not include the accelerator pedal 88. Thus, the accelerator operation amount PA is virtually generated by the generation device 110 simulating the state of the vehicle VC1. The virtually-generated accelerator operation amount PA is regarded as a state of the vehicle that is based on the detection value of the sensor. Further, the vehicle speed V is calculated by the CPU 112 as a traveling speed of the vehicle that can be obtained under the hypothesis that the vehicle actually exists. In the present embodiment, this vehicle speed is regarded as the state of the vehicle based on the detection value of the sensor. Specifically, the CPU 112 uses the output signal Scr of the crank angle sensor 84 to calculate the rotation speed NE of the crankshaft 28, and uses the rotation speed NE and gear ratio GR to calculate the vehicle speed V.

In accordance with a policy π defined by the relationship defining data DR, the CPU 112 sets an action a, which corresponds to the state s obtained through the process of S34 and is defined by the throttle command value TA* and the gear ratio command value GR* (S36).

The relationship defining data DR defines the policy π and an action value function Q. The action value function Q is table-type data. In particular, the action value function Q defined by the driving defining data DR1 indicates values of expected return corresponding to ten-dimensional independent variables of the state s and the action a. When the state s is provided, the action value function Q includes values of the action a at which the independent variable is the provided state s. Among these values, the one at which the expected return is maximized is referred to as a greedy action. The policy π defines rules with which the greedy action is preferentially selected, and an action a different from the greedy action is selected with a predetermined probability.

Specifically, the number of the values of the independent variables of the action value function Q is obtained by deleting a certain amount from all the possible combinations of the state s and the action a, referring to, for example, human knowledge. For example, since human operation of the accelerator pedal 88 would never create situations in which one of two consecutive values in the time-series data of the accelerator operation amount PA is the minimum value of the accelerator operation amount PA and the other one is the maximum value of the accelerator operation amount PA, the action value function Q is not defined. In order for the gear ratio GR to avoid a sudden change from second gear to fourth gear, the gear ratio command value GR* serving as a possible action a is limited to first gear, second gear, and third gear when, for example, the current gear ratio GR is second gear. That is, when the gear ratio GR serving as the state s is second gear, the action a of fourth gear or higher is not defined. Such reduction of the dimensions based on human knowledge limits the number of the possible values of the independent variables defined by the action value function Q to, for example, a number less than or equal to 10 to the fifth power (preferably, a number less than or equal to 10 to the fourth power).

Then, in the same manner as the process of S18, the CPU 112 outputs the operation signals MS1, MS6 based on the set throttle command value TA* and gear ratio command value GR* (S38). Subsequently, the CPU 112 obtains the rotation speed NE, the gear ratio GR, a torque Trq to be input to the torque converter 50, a torque command value Trq*, the vibration intensity VV, and the noise intensity VN (S40). The torque command value Trq* is a command value for the torque input to the torque converter 50. The CPU 112 calculates the torque Trq based on the gear ratio of the transmission 60 and a load torque that is generated by the dynamometer 100. Further, the CPU 112 sets the torque command value Trq* in correspondence with the accelerator operation amount PA and the gear ratio GR. The gear ratio command value GR* is an action variable of reinforcement learning. Thus, every time the internal combustion engine 10 and the motor generator 42 are operated, the gear ratio command value GR* does not necessarily have to set the torque command value Trq* to be less than or equal to the maximum torque, which is achievable by at least one of the internal combustion engine 10 and the motor generator 42. Accordingly, every time the internal combustion engine 10 and the motor generator 42 are operated, the torque command value Trq* does not necessarily have to be less than or equal to the value of the maximum torque, which is achievable by at least one of the internal combustion engine 10 and the motor generator 42.

When determining that the set value of the specifying variable VU corresponds to the power generating mode (S32: NO), the output command value P* and the rotation speed NE are set as the state s (S50). The CPU 112 sets the output command value P* to a value obtained by simulating a command value generated by the vehicle. The output command value P* is normally set based on, for example, the state of charge of the battery 46. The state of charge of the battery 46 is calculated based on, for example, the terminal voltage or charge/discharge current of the battery 46. Thus, the output command value P* set based on the state of charge of the battery 46 is regarded as the state of the vehicle based on the detection value of the sensor.

Then, the CPU 112 sets the action a in accordance with the policy π defined by the power generating defining data DR2 (S52). The action a is the throttle command value TA* corresponding to the state s obtained through the process of S50. Next, the CPU 112 uses the set throttle command value TA* to output the operation signal MS1 in the same manner as the process of S24 (S54). Subsequently, the CPU 112 obtains the torque Trq, the torque command value Trq*, the vibration intensity VV, and the noise intensity VN (S56). The torque command value Trq* is obtained by dividing the rotation speed NE by the output command value P*. The torque Trq is a load torque of the motor generator 42. The load torque is calculated from the currents iu, iv, iw, which flow through the motor generator 42.

Next, the CPU 112 determines whether a predetermined period has elapsed from the later one of the point in time at which the process of S30 was executed and the point in time at which the process of S44 (described later) was executed (S42). Then, when determining that the predetermined period has elapsed (S42: YES), the CPU 112 updates the action value function Q through reinforcement learning (S44). The predetermined period simply needs to be the following period (a) or (b).

(a) A period during which the absolute value of the change amount of the torque command value Trq* becomes a first predetermined value and then becomes a second predetermined value, which is smaller than the first predetermined value, and a period of time having a predetermined length has elapsed.

(b) A period during which the absolute value of the change amount of the torque command value Trq* becomes greater than or equal to the first predetermined value.

Even in the middle of the period defined by (a) or (b), when the mode being executed is switched from one of the driving mode and the power generating mode to the other one, that point in time is set as a start point or an end point of the predetermined period.

Figure 5:
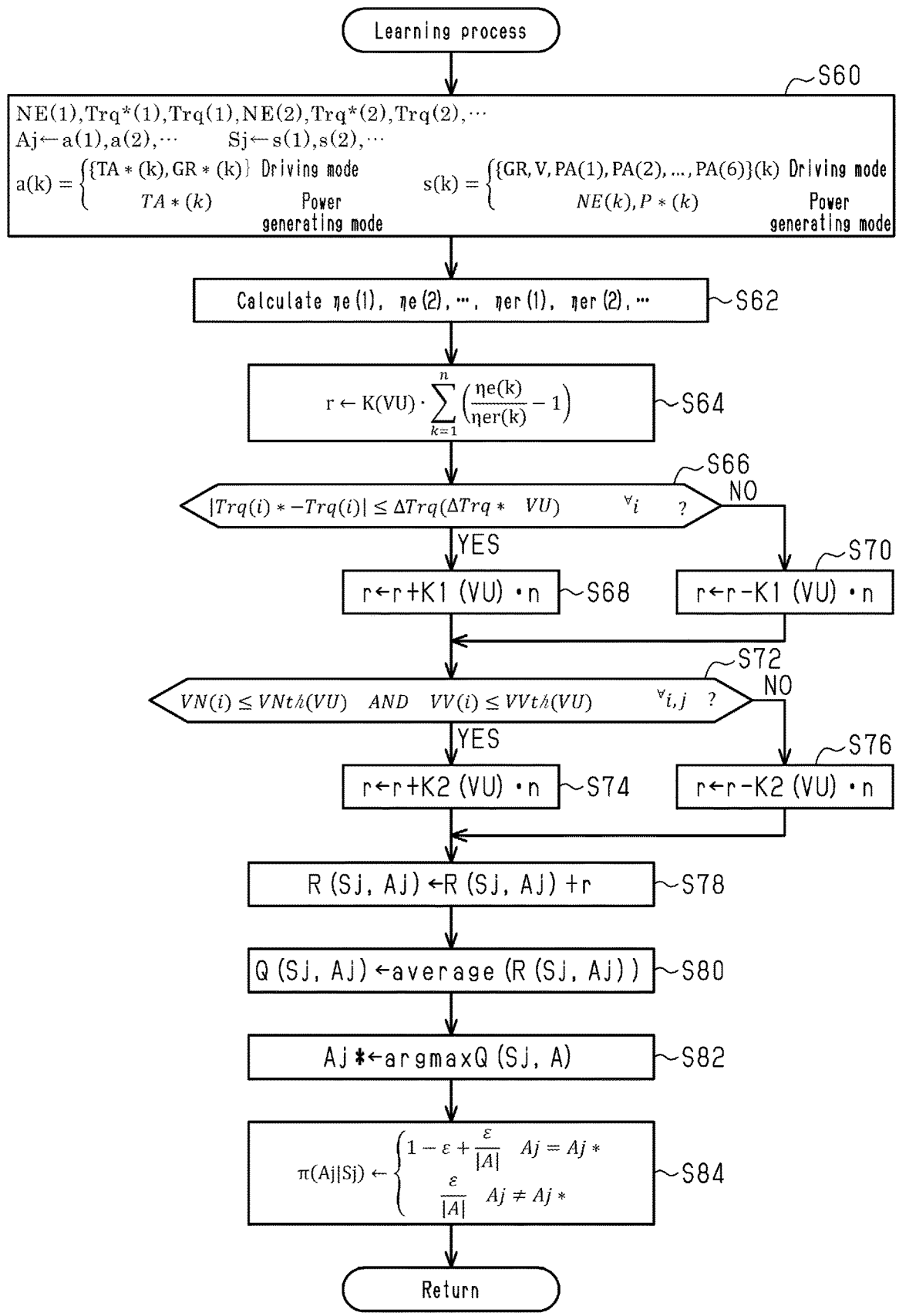
FIG. 5 is a flowchart illustrating the details of a learning process according to the first embodiment.

FIG. 5 illustrates the details of the process of S44.

In a series of processes shown in FIG. 5, the CPU 112 obtains time-series data including groups of three sampled values of the rotation speed NE, the torque command value Trq*, and the torque Trq in the predetermined period, time-series data of the state s, and time-series data of the action a (S60). In FIG. 5, multiple different numbers in parentheses indicate the values of the variables obtained at different sampling points in time. For example, a torque command value Trq*(1) and a torque command value Trq* (2) have been obtained at different sampling points in time. The time-series data of the action a in the predetermined period is defined as an action set Aj, and the time-series data of the state s in the predetermined period is defined as a state set Sj.

Next, the CPU 112 uses the time-series data of the torque Trq and rotation speed NE to calculate the time-series data of an efficiency ηe of the internal combustion engine 10 and the motor generator 42 and the time-series data of a reference efficiency ηer (S62).

Specifically, when the torque of the motor generator 42 is zero in the driving mode or when the power generating mode is being executed, the CPU 112 calculates the efficiency ηe(k) and the reference efficiency ηer of the internal combustion engine 10 based on the operating point determined by the torque Trq(k) and the rotation speed NE(k), where k (1, 2, 3, . . . ) represents a sampling timing. The efficiency $\eta e$ is defined for each operating point of the internal combustion engine 10. The efficiency $\eta e$ is a proportion that can be taken as power in the combustion energy that occurs when the air-fuel ratio of the air-fuel mixture in the combustion chamber 24 of the internal combustion engine 10 is set as a predetermined value and the ignition timing is set as a predetermined timing. The reference efficiency $\eta er$ is defined for each output of the internal combustion engine 10. The reference efficiency $\eta er$ is a value obtained by multiplying, by a predetermined coefficient that is smaller than 1, the maximum value of the proportion that can be taken as power in the combustion energy that occurs when the air-fuel ratio of the air-fuel mixture in the combustion chamber 24 of the internal combustion engine 10 is set as the predetermined value and the ignition timing is set as the predetermined timing. That is, the reference efficiency $\eta er$ is a value obtained by multiplying, by the predetermined coefficient, the proportion that can be taken as power in the operating point where the proportion is the maximum. Specifically, for example, the CPU 112 obtains the efficiency $\eta e$ through map calculation when the ROM 114 stores the map data in which the torque Trq and rotation speed NE are used as input variables and the efficiency $\eta e$ is used as an output variable. Further, for example, the CPU 112 obtains the reference efficiency $\eta er$ through map calculation when the ROM 114 stores the map data in which the output of the product of the torque Trq and rotation speed NE is used as an input variable and the reference efficiency $\eta er$ is used as an output variable.

When the torque of the motor generator 42 is greater than zero in the driving mode, the CPU 112 calculates the torque of the motor generator 42 based on the current flowing through the motor generator 42. Further, the CPU 112 calculates the torque of the internal combustion engine 10 by subtracting the calculated torque of the motor generator 42 from the torque Trq. Then, the CPU 112 calculates an efficiency indicating the proportion of the output of the motor generator 42 to the power input to the inverter 44 based on the torque and rotation speed of the motor generator 42, which determine the operating point of the motor generator 42, and calculates the efficiency of the internal combustion engine 10 based on the torque and rotation speed of the internal combustion engine 10, thereby calculating the efficiency $\eta e$ as the average value of the calculated efficiencies. The reference efficiency $\eta er$ is defined for each power input to the torque converter 50. The reference efficiency $\eta er$ is a value obtained by multiplying the predetermined coefficient by the maximum value that can be taken as the efficiency $\eta e$.

Next, the CPU 112 assigns, to a reward r, a value obtained by multiplying, by a coefficient K, the integration value of a value obtained by subtracting 1 from a value obtained by dividing the efficiency $\eta e(k)$ by the reference efficiency $\eta er(k)$ (S64). This process causes the reward r to be larger when the efficiency $\eta e$ is higher than the reference efficiency $\eta er$ than when the efficiency $\eta e$ is lower than the reference efficiency $\eta er$.

The CPU 112 varies the coefficient K in correspondence with the specifying variable VU. Specifically, the coefficient K is set to a larger value when the specifying variable VU indicates the power generating mode than when the specifying variable VU indicates the driving mode. This setting lowers the standard of the efficiency when a predetermined reward is provided in the power generating mode. That is, the efficiency $\eta e$ is low when the same reward is obtained in the power generating mode. Thus, when a high operating point is selected for the efficiency $\eta e$ in the power generating mode, the value of the reward r becomes larger in the power generating mode than in the driving mode.

Subsequently, the CPU 112 determines whether a condition (A) is met (S66). The condition (A) is that the absolute value of the difference between an arbitrary torque Trq and the torque command value Trq* in the predetermined period is less than or equal to a specified amount $\Delta$Trq.

The CPU 112 variably sets the specified amount $\Delta$Trq using a change amount per unit time $\Delta$Trq* of the torque command value Trq* and the value of the specifying variable VU at the start of the predetermined period. That is, the CPU 112 determines that the episode is related to transient time if the absolute value of the change amount $\Delta$Trq* is large and sets the specified amount $\Delta$Trq to a larger value than in a case in which the episode is related to steady time. Further, the CPU 112 sets the specified amount $\Delta$Trq to be larger in the power generating mode than in the driving mode.

When determining that the above-described absolute value is less than or equal to the specified amount $\Delta$Trq (S66: YES), the CPU 112 adds K1–N to the reward r (S68). When determining that the above-described condition is not met (S66: NO), the CPU 72 subtracts K1–N from the reward r (S70). Here, n refers to the number of samplings of the efficiency $\eta e$ in the predetermined period. The processes from S66 to S70 provide a greater reward when the standard related to the response of torque is met than when the standard is not met.

The CPU 112 variably sets the coefficient K1 in correspondence with the specifying variable VU. Specifically, the CPU 112 sets the coefficient K to be larger in the driving mode than in the power generating mode.

When the process of S68 or S70 is completed, the CPU 112 determines whether the logical conjunction of a condition (B) and a condition (C) is true (S72). The condition (B) is that the noise intensity VN is less than or equal to a threshold value VNth. The condition (C) is that the vibration intensity VV is less than or equal to a threshold value VVth. The CPU 112 sets the threshold values VNth, VVth to be smaller in the power generating mode than in the driving mode. This is because the vehicle VC1 is traveling in the driving mode and thus a greater strength is allowed as noise and vibration in the driving mode as compared with when the vehicle VC1 is not traveling. When determining that the logical conjunction is true (S72: YES), the CPU 112 adds K2–N to the reward r (S74). When determining that the logical conjunction is false (S72: NO), the CPU 112 subtracts K2–N from the reward r (S76). The processes from S72 to S76 provide a greater reward when the state in the passenger compartment meets its standard than when the state in the passenger compartment does not meet the standard.

The CPU 112 variably sets the coefficient K2 in correspondence with the specifying variable VU. Specifically, the CPU 112 sets the coefficient K2 to be larger in the power generating mode than in the driving mode.

When the process of S74 or S76 is completed, the CPU 112 updates the data designated by the process of S30, of the driving defining data DR1 and the power generating defining data DR2 stored in the memory device 76 in FIG. 3. In the present embodiment, a $\varepsilon$-soft on-policy Monte Carlo method is used.

That is, the CPU 112 adds the reward r to respective returns R(Sj, Aj), which are determined by pairs of the states read through the process of S60 and actions corresponding to the respective states (S78). Here, R(Sj, Aj) collectively represents the returns R, each having one of the elements of the state set Sj as the state and one of the elements of the action set Aj as the action. Next, the CPU 112 averages each of the returns R(Sj, Aj), which are determined by pairs of the states and the corresponding actions read through the process of S60, and assigns the averaged return R(Sj, Aj) to the corresponding action value functions Q(Sj, Aj) (S80). The averaging simply needs to be a process that divides the return R, which is calculated through the process of S78, by the number of times the process S78 has been executed. The initial value of the return R simply needs to be 0.

Next, for each of the states read through the process of S60, the CPU 112 assigns, to an action Aj*, an action that maximizes the value of the action value function Q in the corresponding action value function Q(Sj, A) (S82). The sign A represents an arbitrary action that can be taken. The action Aj* can have different values depending on the type of the state read through the process of S60. In view of simplification, the action Aj* is described with the same sign.

Subsequently, the CPU 112 updates the policy π corresponding to each of the states read through the process of S60 (S84). That is, the CPU 112 sets the selection probability of the action Aj* selected through S82 to $(1-\varepsilon)+\varepsilon/|A|$, where |A| represents the total number of actions. The number of the actions other than the action Aj* is represented by |A|−1. The CPU 112 sets the selection probability of each of the actions other than the action Aj* to $\varepsilon/|A|$. The process of S84 is based on the action value function Q that has been updated through the process of S82. Accordingly, the relationship defining data DR, which defines the relationship between the state s and the action a, is updated so as to increase the return R.

When the process of step S84 is completed, the CPU 112 suspends the series of processes shown in FIG. 5.

Referring back to FIG. 4, when the process of S44 is completed, the CPU 112 determines whether the action value function Q has converged (S46). The CPU 112 simply needs to determine that the action value function Q has converged when the number of times the amount of the action value function Q updated by the process of S44 successively becomes a predetermined value reaches a predetermined number of times. When determining that the action value function Q has not converged (S46: NO) or making a negative determination in the process of S42, the CPU 112 returns to the process of S32. When determining that the action value function Q has converged (S46: YES), the CPU 112 determines whether the driving mode and the power generating mode have both been set by the process of S30 (S48).

When determining that one of the driving mode and the power generating mode has not been set yet by the process of S30 (S48: NO), the CPU 112 returns to the process of S30 and sets the specifying variable VU to a value that has not been set yet. When making an affirmative determination in the process of S48, the CPU 112 suspends the series of processes shown in FIG. 4.

Figure 6:
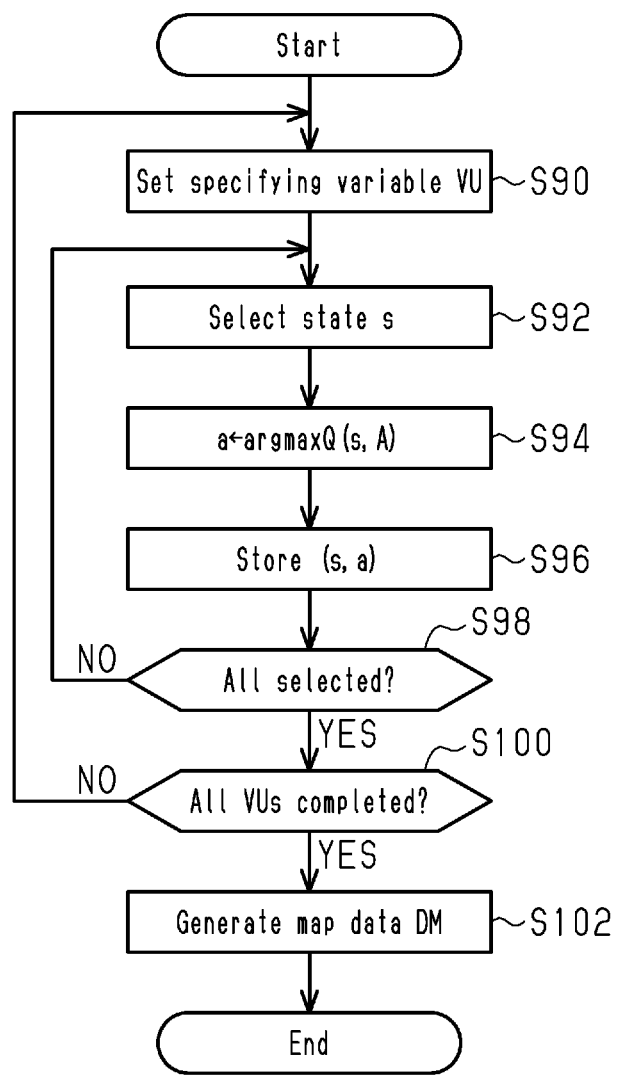
FIG. 6 is a flowchart illustrating a procedure for processes that generate the map data according to the first embodiment.

FIG. 6 shows a procedure for processes that, in particular, generate the map data DM in reference to the action value function Q learned by the process of FIG. 4, in the processes executed by the generation device 110. The processes shown in FIG. 6 are implemented by the CPU 112 executing the learning program 114a stored in the ROM 114.

In the series of processes shown in FIG. 6, the CPU 112 first sets the value of the specifying variable VU (S90). Then, the CPU 112 selects one of plural states s that serves as the value of the input variable corresponding to one of the driving map data DM1 and the power generating map data DM2 that has been set by the process of S90 (S92). Next, the CPU 112 selects the action a that maximizes the value of one of the action value functions Q (s, A) that correspond to the state s and are defined by the data of one of the driving defining data DR1 and the power generating defining data DR2 that corresponds to the value of the specifying variable VU (S94). That is, the action a is selected by a greedy policy. Subsequently, the CPU 112 causes the memory device 116 to store a set of the state s and the action a (S96).

Then, the CPU 112 determines whether the process of S92 has selected all the values of the input variables of one of the driving map data DM1 and the power generating map data DM2 that corresponds to the value of the specifying variable VU (S98). When determining that there is a value that has not been selected (S98: NO), the CPU 112 returns to the process of S92. When determining that all the values have been selected (S98: YES), the CPU 112 determines whether all the values that can be taken as the value of the specifying variable VU have been set by the process of S90 (S100). When determining that there is a value that has not been set yet (S100: NO), the CPU 112 returns to the process of S90 and sets that value.

When determining that all the values have been set (S100: YES), the CPU 112 generates the driving map data DM1 and the power generating map data DM2 (S102). In the map data DM, the value of the output variable corresponding to the value of the input variable, which is the state s, is set as the corresponding action a.

When the process of step S102 is completed, the CPU 112 suspends the series of processes shown in FIG. 6.

The operation and advantages of the present embodiment will now be described.

In the system shown in FIG. 3, the CPU 112 learns the action value function Q through reinforcement learning. When the value of the action value function Q converges, it means that an action suitable for meeting the standard required for the energy use efficiency, the standard required for the response of torque, and the standard related to the state in the passenger compartment. Then, for each of the states serving as the input variables of the map data DM, the CPU 112 selects an action that maximizes the action value function Q and stores a set of the state and action in the memory device 116. Next, the CPU 112 uses the set of state and action stored in the memory device 116 to generate the map data DM. This allows both the driving mode and the power generating mode to set a suitable action in correspondence with the variable that specifies the state without excessively increasing the man-hours by skilled workers.

Particularly, in the present embodiment, reinforcement learning is executed by changing how to provide a reward depending on whether the driving mode or the power generating mode is being executed. Specifically, whereas the standard of the response of torque is made looser in the power generating mode than in the driving mode, the standard related to the state in the passenger compartment is made stricter in the power generating mode than in the driving mode. Thus, during the learning of the power generating defining data DR2, the above-described condition (A) can be met to obtain the reward provided by the process of S68 even if the response of torque is set to be relatively low. Thus, in order to increase the total reward, it is advantageous to minimize vibration and noise by, for example, lowering the response. Accordingly, the power generating map data DM2 allows for control that reduces the noise and vibration in the passenger compartment.

Additionally, the reward provided in the case of a high energy use efficiency is set to be larger in the power generating mode than in the driving mode. Thus, in order to increase the total reward, it is advantageous to set the energy use efficiency to be higher in the power generating mode than in the driving mode. Accordingly, the power generating map data DM2 allows for control that increases the energy use efficiency.

During the learning of the driving defining data DR1, the reward obtained by the process of S64 is small despite an increased efficiency ηe. Thus, in order to increase the total reward, it is advantageous to obtain the reward provided by the process of S68 by increasing the response of torque and meeting the above-described condition (A). Accordingly, the driving map data DM1 enables control with a favorable responsivity for the accelerator operation performed by the user.

The above-described present embodiment further provides the following advantage.

(1) The memory device 76 of the controller 70 stores the map data DM instead of the action value function Q. Thus, the CPU 72 sets, for example, the throttle command value TA* through the map calculation that uses the map data DM. This reduces the computation load as compared with when executing a process that selects the value of an independent variable including the maximum value of the action value function Q.

Second Embodiment

A second embodiment will now be described with reference to the drawings, focusing on the differences from the first embodiment.

Figure 7:
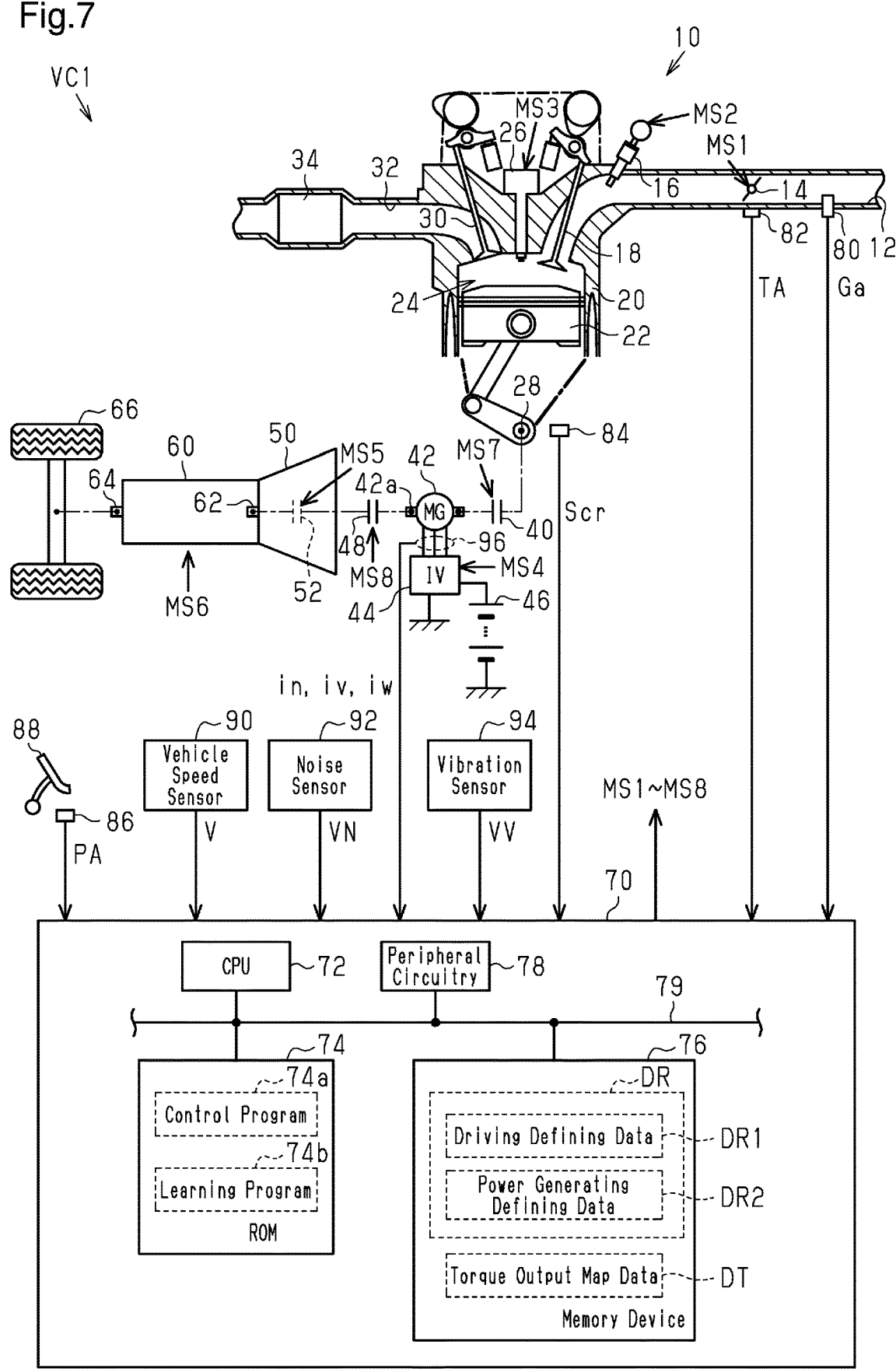
FIG. 7 is a diagram showing the controller and the drive system according to a second embodiment.

FIG. 7 shows the configuration of the drive system and the controller 70 of the vehicle VC1 according to the present embodiment. In FIG. 7, the same reference numerals are given to the components that are the same as those in FIG. 1 for illustrative purposes.

As shown in FIG. 7, in the present embodiment, the ROM 74 stores a learning program 74b in addition to the control program 74a. The memory device 76 stores the relationship defining data DR and torque output mapping data DT instead of the map data DM. The relationship defining data DR refers to pre-trained data that has been learned by the process of FIG. 4, and includes the driving defining data DR1 and the power generating defining data DR2. The torque output map is defined by the torque output map data DT. The torque output map is related to, for example, a pre-trained model of a neural network that uses, as inputs, the rotation speed NE, the charging efficiency η, and the ignition timing and outputs the torque of the internal combustion engine 10. The torque output map data DT may be, for example, data that has been learned by using, as training data, the torque Trq obtained by the process of S56 when the processes of FIG. 4 are executed. The charging efficiency η may be calculated by the CPU 72 based on the rotation speed NE and the intake air amount Ga.

Figure 8:
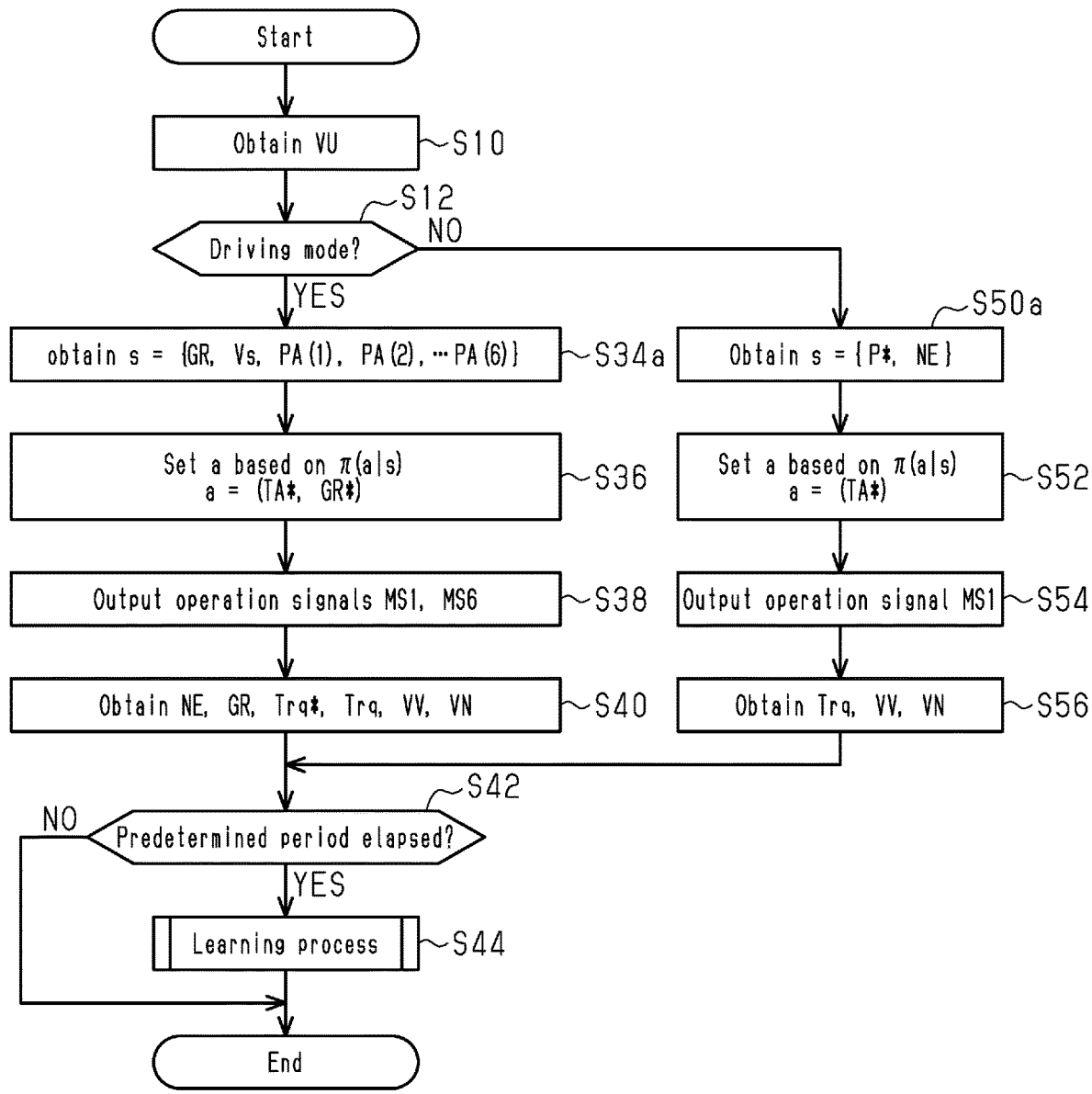
FIG. 8 is a flowchart illustrating a procedure for processes executed by the controller in FIG. 7.

FIG. 8 shows a procedure for processes executed by the controller 70 of the present embodiment. The processes shown in FIG. 8 are implemented by the CPU 72 repeatedly executing the control program 74a and the learning program 74b stored in the ROM 74, for example, in a predetermined cycle. In FIG. 8, the same step numbers are given to the processes that correspond to those in FIG. 4 for illustrative purposes.

In the series of processes shown in FIG. 8, the CPU 72 first executes the processes of S10 and S12 in FIG. 2. When determining that the specifying variable VU indicates the driving mode (S12: YES), the CPU 72 obtains the time-series data of the accelerator operation amount PA, the current gear ratio GR, and the vehicle speed V as the state s (S34a). When determining that the specifying variable VU indicates the power generating mode (S12: NO), the CPU 72 obtains the output command value P* and the rotation speed NE the state s (S50a). When the process of step S34a is completed, the CPU 72 executes the processes from S36 to S44 in FIG. 4. In the process of S40, the CPU 72 calculates the torque based on the torque output map defined by the torque output map data DT and calculates the torque of the motor generator 42 based on the currents iu, iv, iw, thereby setting the sum of the calculated torque as the torque Trq.

When the process of S50a is completed, the CPU 72 executes the processes of S52 to S56, S42, S44. When making a negative determination in the process of S42 or completing the process of S44, the CPU 72 suspends the series of processes shown in FIG. 8. The processes shown in FIG. 8 other than the process of S44 are implemented by the CPU 72 executing the control program 74a, and the process of S44 is implemented by the CPU 72 executing the learning program 74b.

As described above, the relationship defining data DR and the learning program 74b are implemented in the controller 70. Accordingly, as compared with the first embodiment, the learning frequency improves.

Third Embodiment

A third embodiment will now be described with reference to the drawings, focusing on the differences from the second embodiment.

In the present embodiment, the relationship defining data DR is updated outside the vehicle VC1.

Figure 9:
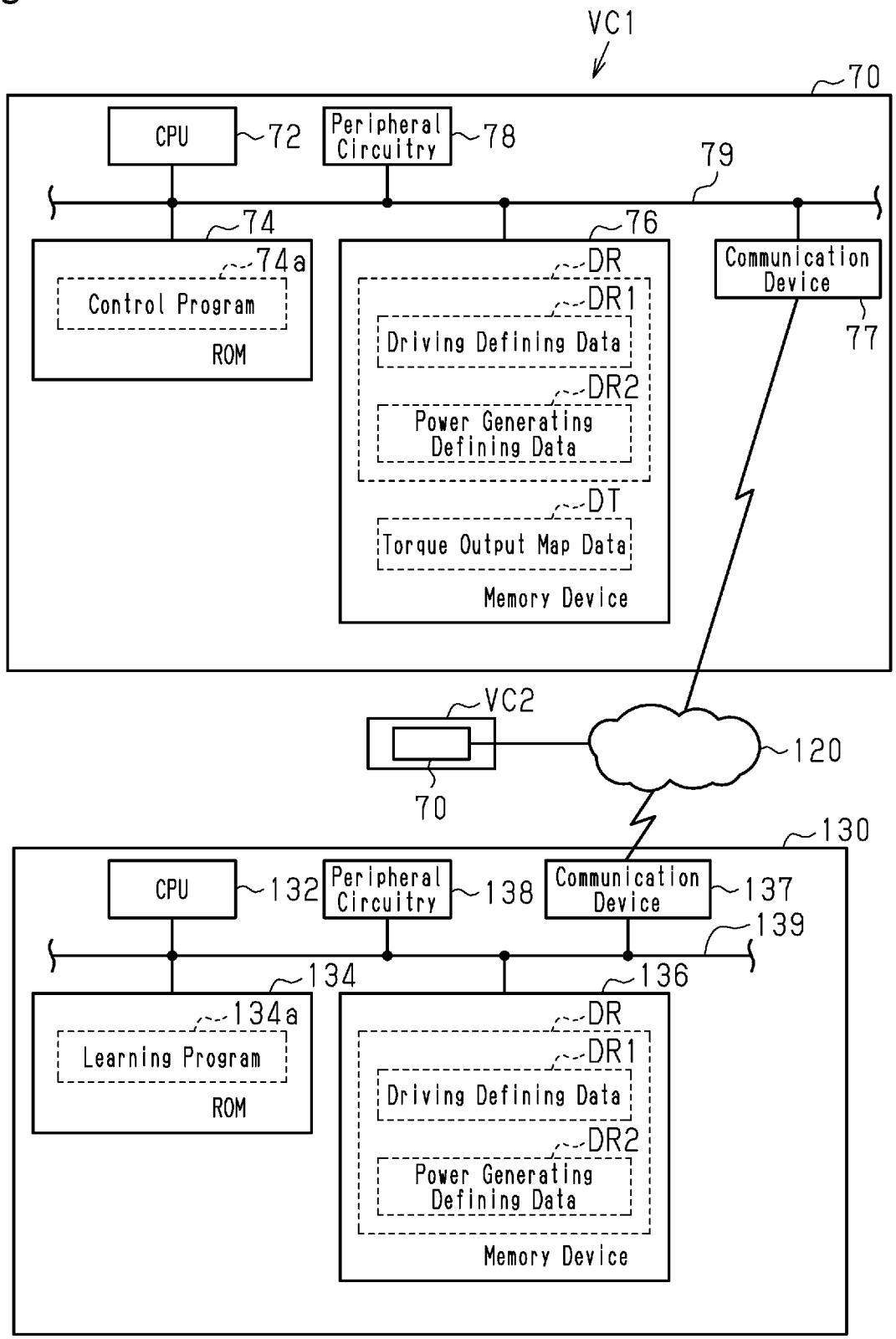
FIG. 9 is a diagram showing the configuration of the system according to a third embodiment.

FIG. 9 shows the configuration of a control system that executes reinforcement learning. In FIG. 9, the same reference numerals are given to the components that are the same as those in FIG. 1 for illustrative purposes.

The ROM 74 of the controller 70 in the vehicle VC1 shown in FIG. 9 stores the control program 74a, but does not store the learning program 74b. The controller 70 includes a communication device 77. The communication device 77 communicates with a data analysis center 130 via a network 120 outside the vehicle VC1.

The data analysis center 130 analyzes the data transmitted from vehicles VC1, VC2, . . . . The data analysis center 130 includes a CPU 132, a ROM 134, an electrically-rewritable nonvolatile memory (memory device 136), peripheral circuitry 138, and a communication device 137, which can communicate with each other via a local network 139. The ROM 134 stores a learning program 134a, and the memory device 136 stores the relationship defining data DR.

Figure 10A:
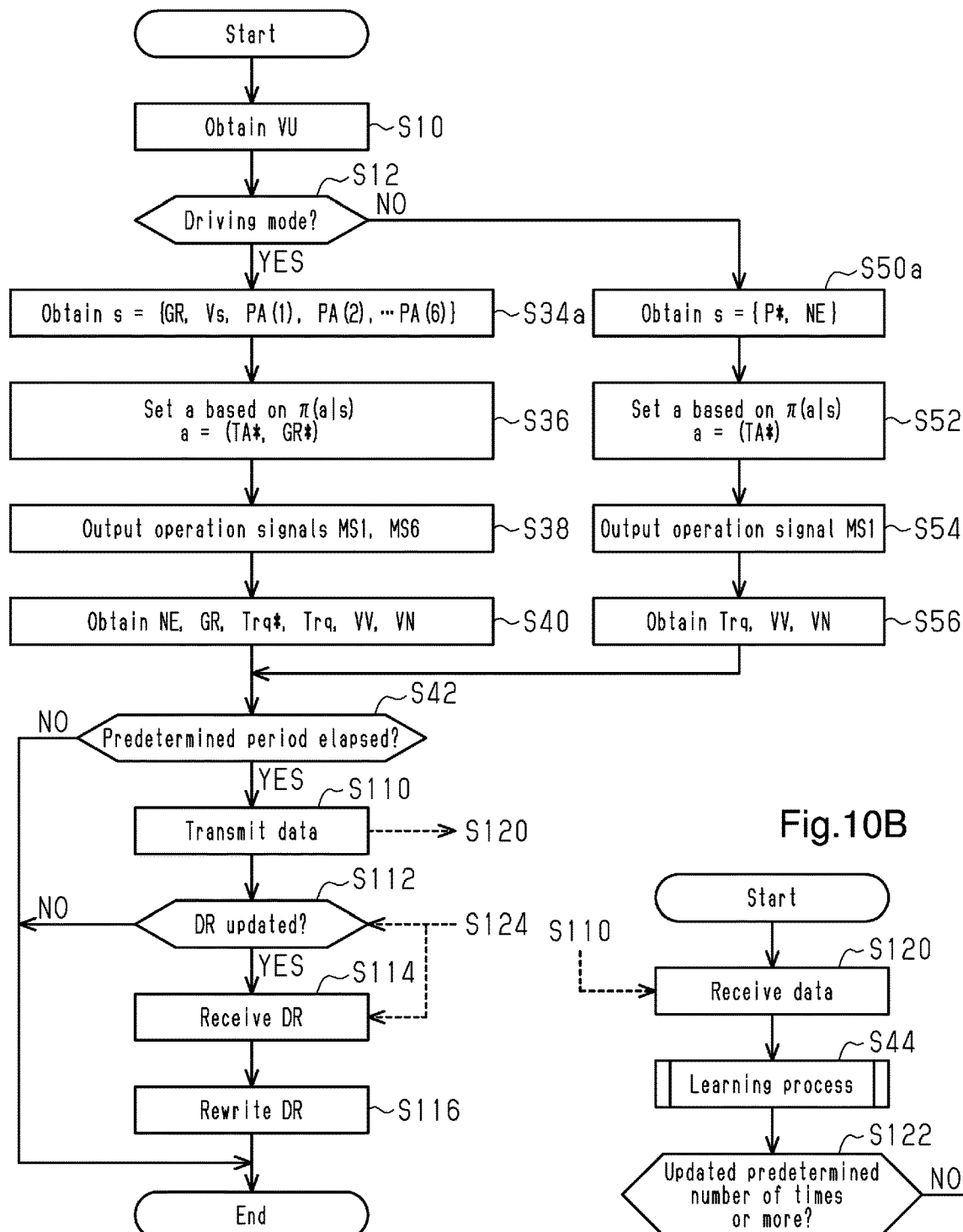
FIG. 10A is a flowchart illustrating a procedure for processes executed by the system according to the third embodiment.
Figure 10B:
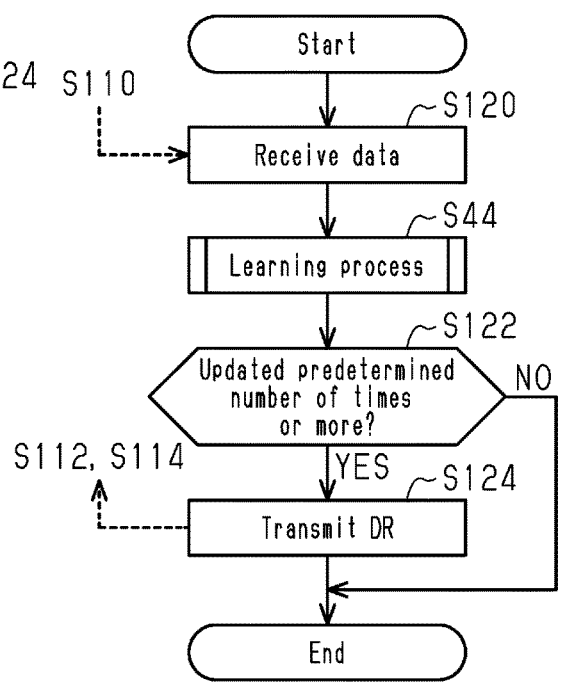
FIG. 10B is a flowchart illustrating a procedure for processes executed by the system according to the third embodiment.

FIGS. 10A and 10B show a procedure for processes of reinforcement learning according to the present embodiment. The processes shown in FIG. 10A are implemented by the CPU 72 executing the control program 74a stored in the ROM 74 shown in FIG. 9. The processes shown in FIG. 10B are implemented by the CPU 132 executing the learning program 134a stored in the ROM 134. In FIGS. 10A and 10B, the same step numbers are given to the processes that correspond to those in FIG. 8 for illustrative purposes. The processes shown in FIGS. 10A and 10B will now be described with reference to the temporal sequence of reinforcement learning.

In the series of processes shown in FIG. 10A, the CPU 72 executes the processes of S10, S12, S34a, S36 to S40 or executes the processes of S10, S12, S50a, S52 to S56. When determining that the predetermined period has elapsed (S42: YES), the CPU 72 operates the communication device 77 to transmit data necessary for the updating process of the relationship defining data DR (S110). The data subject to the transmission includes the time-series data of the rotation speed NE, torque command value Trq*, and torque Trq and include the state set Sj and action set Aj in addition to the value of the specifying variable VU in the predetermined period.

As shown in FIG. 10B, the CPU 132 receives the transmitted data (S120), and updates the relationship defining data DR based on the received data (S44). The CPU 132 determines whether the relationship defining data DR has been updated a predetermined number of times or more (S122). When determining that the update has been performed the predetermined number of times or more (S122: YES), the CPU 132 operates the communication device 137 to transmit the relationship defining data DR to the vehicle VC1 that has transmitted the data received through the process of S120 (S124). When completing the process of S124 or when making a negative determination in the process of S122, the CPU 132 suspends the series of processes shown in FIG. 10B.

As shown in the FIG. 10A, the CPU 72 determines whether there is updated data (S112). When determining that there is updated data (S112: YES), the CPU 72 receives the updated relationship defining data DR (S114). Then, the CPU 72 rewrites the relationship defining data DR used in the processes of S36 and S52 to the received relationship defining data DR (S116). When completing the process of S116 or when making a negative determination in the process of S42 or S112, the CPU 72 suspends the series of processes shown in FIG. 10A.

In this manner, the relationship defining data DR is updated outside the vehicle VC1. This reduces the computation load on the controller 70. Further, for example, in the process of S120, if the process of S44 is executed by receiving the data from multiple vehicles VC1, VC2, the number of data sets used for learning can be easily increased.

Correspondence

The correspondence between the items in the above-described embodiments and the items described in the above-described SUMMARY is as follows. Below, the correspondence is shown for each of the numbers in the examples described in the SUMMARY.

[1] In Example 1, the execution device corresponds to the CPU 72 and ROM 74 in FIG. 7, corresponds to the CPU 112 and ROM 114 in FIG. 3, and corresponds to the CPUs 72, 132 and ROMs 74, 134 in FIG. 9. The memory device corresponds to the memory device 76 in FIG. 7, corresponds to the memory device 116 in FIG. 3, and corresponds to the memory devices 76, 136 in FIG. 9. The obtaining process corresponds to the processes of S30, S34, S40, S50, S56 in FIG. 4 and corresponds to the processes of S10, S34a, S40, S50a, S56 in FIGS. 8 and 10A. The operating process corresponds to the processes of S38, S54. The reward calculating process corresponds to the processes from S62 to S76. The updating process corresponds to the processes from S78 to S84. The update map corresponds to the map defined by the command that executes the processes from S78 to S84 in the learning program 74b. The changing process corresponds to the process that varies, in correspondence with the specifying variable VU, the coefficient K in the process of S64, the condition (A) in the process of S66, the coefficient K1 in the processes of S68, S70, the conditions (B) and (C) in the process of S72, the coefficient K2 in the processes of S74, S76.

[2] In Example 2, the process that changes the reward corresponds to the process that sets the coefficients K and K2 to be larger and sets the coefficient K1 to be smaller in the processes of S64, S68, S70, S74, S76 in the power generating mode than in the driving mode.

[3] In Example 3, the control map data refers to the map data DM.

[4] In Example 4, the execution device corresponds to the CPU 72 and ROM 74 in FIG. 7, and the memory device corresponds to the memory device 76 in FIG. 7.

[5]-[7] In Examples 5 to 7, the first execution device corresponds to the CPU 72 and ROM 74, and the second execution device corresponds to the CPU 132 and ROM 134.

OTHER EMBODIMENTS

The present embodiments may be modified as follows. The above-described embodiments and the following modifications can be combined as long as the combined modifications remain technically consistent with each other.

Regarding Changing Process

Both of the process that changes the standard related to a response like the process of S66 and the process that changes a reward depending on whether the standard related to the response like the processes of S68, S70 do not need to be executed. Instead, only one of them may be executed.

For example, in the power generating mode, the condition (A) may be changed to a condition that cannot be met and zero may be subtracted from the reward r in the process of S70, and in the driving mode, the reference efficiency $\eta er$ in the process of S64 may be set to a high efficiency that cannot be obtained and the larger one of the integration value and zero may be assigned to the reward r. This means that the process that provides a greater reward when the response meets the standard than when the response does not meet the standard is not executed in the power generating mode and the process that provides a greater reward when the energy use efficiency meets the standard than when the energy use efficiency does not meet the standard is not executed in the driving mode. Thus, a process may be executed in which the process that provides a greater reward when the response meets the standard than when the response does not meet the standard is not executed in the power generating mode and the process that provides a greater reward when the energy use efficiency meets the standard than when the energy use efficiency does not meet the standard is not executed in the driving mode. This is also regarded as a process that changes at least one of the process that provides a greater reward when the response meets the standard than when the response does not meet the standard and the process that provides a greater reward when the energy use efficiency meets the standard than when the energy use efficiency does not meet the standard.

For example, the coefficients K1 and K2 may be fixed values. Even in this case, if the coefficient K is set to be larger in the power generating mode than in the driving mode, increasing the energy use efficiency is more advantageous in the power generating mode in order to increase the total reward.

For example, the coefficient K may be a fixed value. Even in this case, if the coefficient K1 is set to be smaller in the power generating mode than in the driving mode, increasing the energy use efficiency is more advantageous in the power generating mode in order to increase the total reward.

When the process that provides a reward depending on whether the absolute value of a change speed of the throttle command value TA* is less than or equal to a predetermined value is executed in the power generating mode as described in the Regarding Reward Calculating Process section below, that process does not have to be executed in the driving mode. Further, in the driving mode, that process may be executed while setting the predetermined value to be larger than the maximum value assumed as the absolute value of the change speed of the throttle command value TA*. This means that the process that provides a greater reward when the absolute value of the change speed of the throttle command value TA* is less than or equal to the predetermined value than when the absolute value is larger than the predetermined value is not executed in the driving mode. Thus, the non-execution of that process in the driving mode is regarded as a process that changes the predetermined value such that the predetermined value differs between the power generating mode and the driving mode.

Regarding Energy Use Efficiency

In the above-described embodiments, the energy use efficiency is quantified based on only operating points. Instead, for example, when the ignition timing is included in the action variable and the employed ignition timing deviates from the MBT as described in the Regarding Action Variable section below, the energy use efficiency simply needs to be corrected so as to decrease in correspondence with the deviation amount. Further, when a variable related to air-fuel ratio control is included in the action variable and the employed air-fuel ratio deviates from a predetermined air-fuel ratio, the energy use efficiency simply needs to be corrected in correspondence with the deviation amount.

In the above-described embodiments, the efficiency $\eta e$ obtained when the motor generator 42 is being driven is calculated by simply averaging the efficiency of the motor generator 42 and the efficiency of the internal combustion engine 10. Instead, for example, the weight coefficient corresponding to the ratio of the output of the motor generator 42 to the output of the internal combustion engine 10 may be used to calculate a weighted moving average process value of the efficiency of the motor generator 42 and the efficiency of the internal combustion engine 10.

Regarding Reduction of Dimensions of Table-Type Data

The method of reducing the dimensions of table-type data is not limited to the one in the above-described embodiments. For example, the accelerator operation amount PA rarely reaches the maximum value. Thus, the action value function Q does not necessarily have to be defined for the state in which the accelerator operation amount PA is greater than or equal to the specified amount in the driving defining data DR1, and the throttle command value TA* and the like may be set independently when the accelerator operation amount PA is greater than or equal to the specified amount. Further, the dimensions may be reduced by removing, from possible values of the action, values at which the throttle command value TA* is greater than or equal to the specified value.

Regarding Relationship Defining Data

In the above-described embodiments, the action value function Q is a table-type function. Instead, for example, a function approximator may be used.

For example, instead of using the action value function Q, the policy $\pi$ may be expressed by a function approximator that uses the state s and the action a as independent variables and uses the possibility that the action a will be taken as a dependent variable, and the parameters defined by the function approximator may be updated in correspondence with the reward r.

Regarding Operating Process

For example, when using a function approximator as the action value function Q as described in the Regarding Relationship Defining Data section, all the groups of discrete values related to actions that are independent variables of the table-type function of the above-described embodiments simply need to be input to the action value function Q together with the state s, so as to specify the action a that maximizes the action value function Q. In this case, for example, while the specified action a is mainly employed for operation, the other actions simply need to be selected at a predetermined probability.

For example, when the policy $\pi$ is a function approximator that uses the state s and the action a as independent variables and uses the probability that the action a will be taken as a dependent variable as in the Regarding Relationship Defining Data section, the action a simply needs to be selected based on the probability indicated by the policy $\pi$.

Regarding Update Map

The $\epsilon$-soft on-policy Monte Carlo method is executed in the process from S78 to S84. Instead, for example, an off-policy Monte Carlo method may be used. Also, methods other than Monte Carlo method may be used. For example, an off-policy TD method may be used. As another option, an on-policy TD method such as a SARSA method may be used. Alternatively, an eligibility trace method may be used as on-policy learning.

For example, when the policy $\pi$ is expressed using a policy $\pi$ and the policy $\pi$ is directly updated based on the reward r as described in the Regarding Relationship Defining Data section, the update map simply needs to be constructed using, for example, a policy gradient method.

The present disclosure is not limited to the configuration in which only one of the action value function Q and the policy $\pi$ is directly updated using the reward r. For example, the action value function Q and the policy $\pi$ may be separately updated as in an actor critic method. Further, in the actor critic method, for example, a value function V may be updated instead of the action value function Q.

Regarding Action Variable

In the above-described embodiments, the throttle command value TA* is used as an example of the variable related to the opening degree of a throttle valve, which is an action variable in the driving mode. Instead, for example, the responsivity of the throttle command value TA* to the accelerator operation amount PA may be expressed by dead time and a secondary delay filter, and three variables in total, which include the dead time and two variables defining the secondary delay filter, may be used as variables related to the opening degree of the throttle valve. In this case, the state variable simply needs to be the amount of change per unit time of the accelerator operation amount PA instead of the time-series data of the accelerator operation amount PA.

In the above-described embodiments, the variable related to the opening degree of the throttle valve is used as an example of the action variable related to operation of the operation units of the internal combustion engine. Instead, for example, in addition to the variable related to the opening degree of the throttle valve, the variable related to ignition timing and the variable related to air-fuel ratio control may be used.

As described below in the Regarding Internal Combustion Engine section, in the case of a compression ignition internal combustion engine, a variable related to an injection amount simply needs to be used instead of the variable related to the opening degree of the throttle valve. In addition to the variable related to the injection timing, for example, it is possible to use a variable related to the number of times of injection within a single combustion cycle or use a variable related to the time interval between the ending point in time of one fuel injection and the starting point in time of the subsequent fuel injection for a single cylinder within a single combustion cycle.

When the electronic device subject to operation corresponding to an action variable includes a compressor for an engine-driven air conditioner as described in the Regarding Electronic Device section below, the action variable may include a load torque of the compressor. In the same manner, when the electronic device subject to the operation includes a motor-driven air conditioner, the action variable may include the power consumption of the motor-driven air conditioner.

Regarding State

In the above-described embodiments, the time-series data of the accelerator operation amount PA includes six values that are sampled at equal intervals. Instead, the time-series data of the accelerator operation amount PA simply needs to include two or more (for example, three) values that are sampled at different points in time. The sampling intervals of these values simply need to be equal.

The state variable related to the accelerator operation amount is not limited to the time-series data of the accelerator operation amount PA. Instead, for example, as described in the Regarding Action Variable section, the amount of change per unit time of the accelerator operation amount PA may be used.

The state variable related to the internal combustion engine 10 is not limited to the one illustrated in the above-described embodiments and may be, for example, the temperature of the catalyst 34. Thus, the action that improves the characteristics of exhaust gas discharged from the exhaust passage 32 toward the outside can be learned through reinforcement learning.

The state variable may include, for example, the charging/discharging current amount of the battery 46, the state of charge of the battery 46, or an output requested for the battery 46. Thus, a more suitable action for increasing the energy use efficiency can be learned through reinforcement learning.

Further, for example, when the action includes the load torque of the compressor or the power consumption of the air conditioner as described in the Regarding Action Variable section, the state simply needs to include the temperature in the passenger compartment.

Regarding Reward Calculating Process

The process that provides a greater reward when the energy use efficiency is high than when the energy use efficiency is low is not limited to the process that obtains the difference between the ratio of the reference efficiency to the efficiency of an actual operating point from 1. Instead, for example, a process that obtains the difference between the reference efficiency and the efficiency of an actual operating point may be employed.

For example, instead of providing the same reward without exception when the condition (A) is met, a process may be executed in which a greater reward is provided when the absolute value of the difference between the torque Trq and the torque command value Trq* is small than when the absolute value is large. Also, instead of providing the same reward without exception when the condition (A) is not met, a process may be executed in which a smaller reward is provided when the absolute value of the difference between the torque Trq and the torque command value Trq* is large than when the absolute value is small.

The process that provides a greater reward when the standard related to the response is met than when the standard is not met is not limited to the process illustrated in the above-described embodiments. Instead, only when the absolute value of the change amount $\Delta$Trq* is greater than or equal to a predetermined value, a process may be executed that provides a greater reward when the condition (A) is met than when the condition (A) is not met. In this case, when the absolute value of the change amount $\Delta$Trq* is less than the predetermined value, an additional process may be executed that provides a reward when the followability to the torque command value Trq* is satisfied than when the followability is not satisfied. In this case, the standard or reward of the followability in the additional process may be the same in the driving mode and the power generating mode.

In the driving mode, the process that provides a greater reward when the standard related to the response is met than when the standard is not met is not limited to the process that provides a reward depending on the above-described condition (A) is met. Instead, for example, only when the absolute value of the change amount $\Delta$Trq* is greater than or equal to the predetermined value, a process may be executed that provides a reward, for example, when the condition that the longitudinal acceleration of the vehicle is in a range set based on the accelerator operation amount PA.

The process that provides a greater reward when the state in the passenger compartment meets the standard than when the passenger compartment meets the standard is not limited to the process that provides a reward depending on the logical conjunction of the condition (B) and the condition (C) is true. Instead, for example, that process may be divided into two processes, namely, a process that provides a reward depending on whether the condition (B) is met and a process that provides a reward depending on whether the condition (C) is met. Alternatively, only one of the two processes may be executed.

The process that provides a greater reward when the intensity of the vibration resulting from the running of the internal combustion engine 10 is large than when the intensity is small is not limited to the process that provides a greater reward when the condition (C) is met than when the condition (C) is not met. Instead, for example, a process may be executed that provides a greater reward when the variation amount of an instantaneous rotation speed is small than the variation amount is large. The instantaneous rotation speed refers to the rotation speed of the crankshaft 28 in an extremely small rotation angle region. If a process is executed that provides a greater reward when the variation amount is smaller than a threshold value than when the variation amount is larger than the threshold value, the threshold value simply needs to be smaller in the power generating mode than in the driving mode. However, the threshold value does not necessarily have to be smaller in the power generating mode than in the driving mode. The threshold value may be larger in the power generating mode than in the driving mode because, for example, the coupling of the crankshaft 28 to the drive system causes the vehicle to easily vibrate in the driving mode while the vehicles does not easily vibrate in the power generating mode when the crankshaft 28 is not coupled to the drive system.

The reward calculating process may include, for example, a process that provides a greater reward when the exhaust characteristics meet a standard than when the exhaust characteristics does not meet the standard, in addition to the process that provides a greater reward when the standard related to the response is met than when the standard is not met, the process that provides a greater reward when the energy use efficiency meets the standard than when the energy use efficiency does not meet the standard, and the process that provides a greater reward when the state in the passenger compartment meets the standard than when the state in the passenger compartment does not meet the standard. Alternatively, instead of these three processes, the reward calculating process may include the process that provides a greater reward when the exhaust characteristics meet the standard than when the exhaust characteristics does not meet the standard. In this case, a requested element related to acceleration response does not need to be taken into consideration in the power generating mode. Thus, the standard related to exhaust characteristics may be made stricter.

The power generating mode may include a process that provides a greater reward when the absolute value of the change speed of the throttle command value TA* is less than or equal to a predetermined value than when the absolute value is greater than the predetermined value. This prevents an abrupt change in the operating state of the internal combustion engine 10. As a result, the air-fuel ratio can be easily controlled with high accuracy. This allows the exhaust characteristics in the power generating mode to meet a stricter standard. In other words, without executing the process that provides a greater reward when the exhaust characteristics meet the standard than when the exhaust characteristics do not meet the standard and the process that makes the standard of the exhaust characteristics stricter in the power generating mode than in the driving mode, it is possible to achieve the effects gained by executing these processes.

A process may be executed that provides a greater reward when the absolute value of the change speed of torque of the internal combustion engine 10 is in a predetermined range than when the absolute value is not in the predetermined range. If the predetermined range is set such that the absolute value of the change speed is smaller in the power generating mode than in the driving mode, controlling air-fuel ratio with high accuracy is easy in the power generating mode. Alternatively, in a case where the absolute value of the acceleration of the vehicle does not become excessively large even if the torque of the internal combustion engine 10 is abruptly changed, the predetermined range may be set such that the absolute value of the change speed is larger in the power generating mode than in the driving mode.

Regarding Vehicle Control Data Generation Method

In the processes of S34, S50 in FIG. 4, an action is determined based on the action value function Q. Instead, all the actions that are possibly taken may be selected at the same probability.

Regarding Control Map Data

The control map data that uses the state of the vehicle as an input and outputs the value of the action variable that maximizes the expected return by associating the state of the vehicle with the value of the action variable that maximizes the expected return one-on-one is not limited to map data. Instead, for example, a function approximator may be used. When, for example, the policy gradient method is used as described in the Regarding Update Map section above, the policy $\pi$ is expressed with a Gaussian distribution indicating the probability of taking the values of the action variable and the average value is expressed by the function approximator. Then, the parameter of the function approximator that expresses the average value is updated to set the average value subsequent to learning as the control map data. That is, the average value output by the function approximator is regarded as the value of the action variable that maximizes the expected return.

Regarding Electronic Device

The operation unit of the internal combustion engine subject to the operation corresponding to the action variable is not limited to the throttle valve 14 and may be, for example, the ignition device 26 or the fuel injection valve 16.

Of the electronic devices subject to operation corresponding to the action variable, the electronic device related to the propelling force generator of the vehicle is not limited to the operation unit of the internal combustion engine. Instead, for example, the electronic device may be a power conversion circuit connected to a rotating electric machine such as the inverter 44.

The electronic device subject to operation corresponding to the action variable is not limited to the electronic device of an in-vehicle driving system. Instead, for example, the electronic device may be a compressor for an engine-driven air conditioner or a motor-driven air conditioner.

In both the driving mode and the power generating mode, the operation units of the internal combustion engine do not necessarily have to be subject to operation corresponding to the action variable. For example, in the above-described embodiments, the throttle command value TA* may be deleted from the action variable in the case of the driving mode.

Regarding Vehicle Control System

In the example shown in FIGS. 10A and 10B, the processes of S44 are all executed in the data analysis center 130. Instead, for example, the processes from S78 to S84 may be executed in the data analysis center 130 without executing the reward-calculating processes from S62 to S76 so as to transmit the calculation result of the reward in the process of S110.

In the example shown in FIGS. 10A and 10B, the processes of S36, S52, which determine an action that is based on the policy π, are executed by the vehicle. Instead, for example, the data obtained through the process of S34a or S50a may be transmitted from the vehicle VC1 to determine the action a in the data analysis center 130 using the transmitted data and transmit the determined action to the vehicle VC1.

In the vehicle control system, for example, the data analysis center 130 may be replaced with a mobile terminal of the user. Alternatively, the vehicle control system may include the mobile terminal in addition to the controller 70 and the data analysis center 130. This is achieved by, for example, the portable terminal executing the processes of S36, S52.

Regarding Mode

In the above-described embodiments, in the driving mode, the torque of the internal combustion engine in the running state of the internal combustion engine is used to generate a propelling force of the vehicle. Instead, for example, a mode that generates the propelling force of the vehicle using only the torque of the internal combustion engine 10 and a mode that generates the propelling force of the vehicle by combining the torque of the internal combustion engine 10 and the torque of the motor generator 42 may be separately executed as different modes.

In a series-parallel hybrid vehicle described in the Regarding Hybrid Vehicle section below, when the output of a motor generator, for which power running control is performed, is greater than or equal to an output contributing to the propelling force of the vehicle, a mode is defined in which the torque of the internal combustion engine in the running state of the internal combustion engine is not used to generate the propelling force of the vehicle. For example, when the crankshaft of the internal combustion engine is mechanically coupled to the carrier of a planetary gear mechanism, a first motor generator is mechanically coupled to the sun gear, and a second motor generator and driven wheels are mechanically coupled to the ring gear, power generation control and power running control simply need to be respectively performed for the first motor generator and the second motor generator in the running state of the internal combustion engine. In this case, when the output of the second motor generator is greater than or equal to the output contributing to the generation of the propelling force of the vehicle, a first mode simply needs to be executed in which the torque of the internal combustion engine in the running state of the internal combustion engine is not used to generate the propelling force of the vehicle. When the output of the second motor generator is less than the output contributing to the generation of the propelling force of the vehicle, a second mode simply needs to be executed in which the torque of the internal combustion engine in the running state of the internal combustion engine is used to generate the propelling force of the vehicle. In the second mode, a driven state of the internal combustion engine contributes to acceleration response. Thus, for example, it is effective to increase a reward provided when the standard of the followability to a command value of the torque given to the driven wheels 66 is met. In the first mode, the acceleration response can be determined by only the second motor generator. Thus, for example, it is effective to increase a reward provided when the standard of the energy use efficiency is met.

Regarding Execution Device

The execution device is not limited to the device that includes the CPU 72 (112, 132) and the ROM 74 (114, 134) and executes software processing. For example, a dedicated hardware circuit (such as ASIC) may be provided that executes at least part of the software processes executed in the above-described embodiments. That is, the execution device may be modified as long as it has any one of the following configurations (a) to (c): (a) a configuration including a processor that executes all of the above-described processes according to programs and a program storage device such as a ROM that stores the programs; (b) a configuration including a processor and a program storage device that execute part of the above-described processes according to the programs and a dedicated hardware circuit that executes the remaining processes; and (c) a configuration including a dedicated hardware circuit that executes all of the above-described processes. Multiple software processing devices each including a processor and a program storage device and multiple dedicated hardware circuits may be provided. That is, the above-described processes may be executed in any manner as long as the processes are executed by processing circuitry that includes at least one of a set of one or more software processing circuits and a set of one or more dedicated hardware circuits.

Regarding Memory Device

In the above-described embodiments, the memory device storing the relationship defining data DR and the memory device (ROM 74, 114, 134) storing the learning program 74b, 114a and the control program 74a are separate from each other. However, the present disclosure is not limited to this.

Regarding Internal Combustion Engine

The fuel injection valve of the internal combustion engine is not limited to a port injection valve that injects fuel into the intake passage 12 and may be a direct injection valve that injects fuel into the combustion chamber 24. Alternatively, the internal combustion engine may include both the port injection valve and the direct injection valve.

The internal combustion engine is not limited to a spark ignition engine, but may be a compression ignition engine that uses, for example, light oil as fuel.

Regarding Hybrid Vehicle

The hybrid vehicle is not limited to a series-parallel hybrid vehicle and may be, for example, a series-parallel hybrid vehicle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A vehicle control data generation method, wherein a memory device stores relationship defining data that defines a relationship between a state of a vehicle including a rotating electric machine and an internal combustion engine and an action variable related to operation of an electronic device in the vehicle, the generation method comprising causing processing circuitry to execute:
an obtaining process that obtains a specifying variable, the specifying variable specifying whether the state of the vehicle obtained based on a detection value of a sensor and torque generated by the internal combustion engine in a running state of the internal combustion engine are used to generate a propelling force of the vehicle;
an operating process that operates the electronic device;
a reward calculating process that provides, based on the state of the vehicle obtained by the obtaining process, a greater reward when a characteristic of the vehicle meets a standard than when the characteristic of the vehicle does not meet the standard; and
an updating process that updates the relationship defining data by inputting, to a predetermined update map, the state of the vehicle obtained by the obtaining process, a value of the action variable used to operate the electronic device, and the reward corresponding to the operation of the electronic device,
the update map outputs the updated relationship defining data so as to increase an expected return for the reward in a case where the electronic device is operated in accordance with the relationship defining data, and
the reward calculating process includes a changing process that changes the reward, provided when the characteristic of the vehicle is a predetermined characteristic, such that the reward in a case where the torque generated by the internal combustion engine in the running state of the internal combustion engine is used to generate the propelling force of the vehicle differs from the reward in a case where the torque is not used to generate the propelling force.

2. The vehicle control data generation method according to claim 1, wherein
the reward calculating process includes a process that provides a greater reward when an energy use efficiency is high than when the energy use efficiency is low, and
the changing process includes a process that changes the reward such that increasing the energy use efficiency becomes more advantageous to obtain a great reward in the case where the torque generated by the internal combustion engine in the running state of the internal combustion engine is not used to generate the propelling force of the vehicle than in the case where the torque is used to generate the propelling force.

3. The vehicle control data generation method according to claim 1, further comprising causing the processing circuitry to execute a process that generates control map data, based on the relationship defining data updated by the updating process, by associating the state of the vehicle with the value of the action variable that maximizes the expected return, the control map data using the state of the vehicle as an input and outputting the value of the action variable that maximizes the expected return.

4. A controller for a vehicle including a rotating electric machine and an internal combustion engine, the controller comprising:
a memory device configured to store relationship defining data that defines a relationship between a state of the vehicle and an action variable related to operation of an electronic device in the vehicle; and
processing circuitry, wherein
the processing circuitry is configured to execute:
an obtaining process that obtains a specifying variable, the specifying variable specifying whether the state of the vehicle obtained based on a detection value of a sensor and torque generated by the internal combustion engine in a running state of the internal combustion engine are used to generate a propelling force of the vehicle;
an operating process that operates, based on the relationship defining data, the electronic device in correspondence with a value of the action variable corresponding to the state of vehicle;
a reward calculating process that provides, based on the state of the vehicle obtained by the obtaining process, a greater reward when a characteristic of the vehicle meets a standard than when the characteristic of the vehicle does not meet the standard; and
an updating process that updates the relationship defining data by inputting, to a predetermined update map, the state of the vehicle obtained by the obtaining process, a value of the action variable used to operate the electronic device, and the reward corresponding to the operation of the electronic device,
the update map outputs the updated relationship defining data so as to increase an expected return for the reward in a case where the electronic device is operated in accordance with the relationship defining data, and
the reward calculating process includes a changing process that changes the reward, provided when the characteristic of the vehicle is a predetermined characteristic, such that the reward in a case where the torque generated by the internal combustion engine in the running state of the internal combustion engine is used to generate the propelling force of the vehicle differs from the reward in a case where the torque is not used to generate the propelling force.

5. A control system for a vehicle including a rotating electric machine and an internal combustion engine, the control system comprising:
a memory device configured to store relationship defining data that defines a relationship between a state of the vehicle and an action variable related to operation of an electronic device in the vehicle; and
processing circuitry, wherein
the processing circuitry is configured to execute:
an obtaining process that obtains a specifying variable, the specifying variable specifying whether the state of the vehicle obtained based on a detection value of a sensor and torque generated by the internal combustion engine in a running state of the internal combustion engine are used to generate a propelling force of the vehicle;
an operating process that operates, based on the relationship defining data, the electronic device in correspondence with a value of the action variable corresponding to the state of vehicle;

a reward calculating process that provides, based on the state of the vehicle obtained by the obtaining process, a greater reward when a characteristic of the vehicle meets a standard than when the characteristic of the vehicle does not meet the standard; and an updating process that updates the relationship defining data by inputting, to a predetermined update map, the state of the vehicle obtained by the obtaining process, a value of the action variable used to operate the electronic device, and the reward corresponding to the operation of the electronic device, the update map outputs the updated relationship defining data so as to increase an expected return for the reward in a case where the electronic device is operated in accordance with the relationship defining data, the reward calculating process includes a changing process that changes the reward, provided when the characteristic of the vehicle is a predetermined characteristic, such that the reward in a case where the torque generated by the internal combustion engine in the running state of the internal combustion engine is used to generate the propelling force of the vehicle differs from the reward in a case where the torque is not used to generate the propelling force, the processing circuitry includes a first processing circuitry mounted on the vehicle and a second processing circuitry that differs from an in-vehicle device, the first processing circuitry is configured to execute at least the obtaining process and the operating process, and the second processing circuitry is configured to execute at least the updating process.

6. A vehicle controller, comprising the first processing circuitry of the vehicle control system according to claim 5.

7. A vehicle learning device, comprising the second processing circuitry of the vehicle control system according to claim 5.

* * * * *